US011494258B2

(12) United States Patent
Richter et al.

(10) Patent No.: US 11,494,258 B2
(45) Date of Patent: Nov. 8, 2022

(54) DYNAMIC CONTROL OF ERROR MANAGEMENT AND SIGNALING

(71) Applicant: Micron Technology, Inc., Boise, ID (US)

(72) Inventors: Michael Dieter Richter, Ottobrunn (DE); Thomas Hein, Munich (DE); Wolfgang Anton Spirkl, Germering (DE); Martin Brox, Munich (DE); Peter Mayer, Neubiberg (DE)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/486,751

(22) Filed: Sep. 27, 2021

(65) Prior Publication Data

US 2022/0012122 A1    Jan. 13, 2022

Related U.S. Application Data

(63) Continuation of application No. 16/711,354, filed on Dec. 11, 2019, now Pat. No. 11,138,064.

(Continued)

(51) Int. Cl.
*G06F 11/00* (2006.01)
*G06F 11/10* (2006.01)
*G01K 1/024* (2021.01)

(52) U.S. Cl.
CPC .......... *G06F 11/1004* (2013.01); *G01K 1/024* (2013.01); *G06F 11/1068* (2013.01)

(58) Field of Classification Search
None
See application file for complete search history.

(56) References Cited

U.S. PATENT DOCUMENTS

2003/0172328 A1* 9/2003 Wyatt ................ G06F 11/0727
714/704
2010/0332950 A1* 12/2010 Billing ............... G06F 11/1008
711/E12.007

(Continued)

FOREIGN PATENT DOCUMENTS

KR    20100083800 A    7/2010

OTHER PUBLICATIONS

A. Silvagni, G. Fusillo, R. Ravasio, M. Picca and S. Zanardi, "An overview of logic architectures inside flash memory devices," in Proceedings of the IEEE, vol. 91, No. 4, pp. 569-580, Apr. 2003, doi: 10.1109/JPROC.2003.811707. (Year: 2003).*

(Continued)

*Primary Examiner* — Daniel F. McMahon
(74) *Attorney, Agent, or Firm* — Holland & Hart LLP

(57) ABSTRACT

Methods, systems, and devices for error detection, error correction, and error management by memory devices are described. Programmable thresholds may be configured for a memory device based on a type of data or a location of stored data, among other aspects. For example, a host device may configure a threshold quantity of errors for data at a memory device. When retrieving the data, the memory device may track or count errors in the data and determine whether the threshold has been satisfied. The memory device may transmit (e.g., to the host device) an indication whether the threshold has been satisfied, and the system may perform functions to correct the errors and/or prevent further errors. The memory device may also identify errors in received commands or may identify errors introduced in data after the data was received (e.g., using an error detecting code associated with a command or bus).

20 Claims, 10 Drawing Sheets

Related U.S. Application Data

(60) Provisional application No. 62/779,024, filed on Dec. 13, 2018.

(56) References Cited

U.S. PATENT DOCUMENTS

| | | | | |
|---|---|---|---|---|
| 2013/0055047 | A1* | 2/2013 | Sharon | G11C 29/52 714/764 |
| 2014/0211579 | A1* | 7/2014 | Lovelace | G11C 29/028 365/200 |
| 2014/0245105 | A1* | 8/2014 | Chung | G06F 3/0604 714/763 |
| 2014/0281661 | A1* | 9/2014 | Milton | G06F 11/0793 714/2 |
| 2015/0154065 | A1 | 6/2015 | Ghaly et al. | |
| 2015/0363248 | A1* | 12/2015 | D'Abreu | G06F 11/1068 714/37 |
| 2016/0224412 | A1 | 8/2016 | Healy et al. | |
| 2017/0060657 | A1 | 3/2017 | Healy et al. | |
| 2018/0053545 | A1 | 2/2018 | Son | |
| 2018/0173419 | A1* | 6/2018 | Dubeyko | G06F 3/0688 |
| 2018/0246775 | A1* | 8/2018 | Sankaranarayanan | G06F 11/1048 |
| 2020/0117540 | A1* | 4/2020 | Boehm | G11C 11/409 |
| 2020/0192749 | A1* | 6/2020 | Richter | G06F 11/1004 |

OTHER PUBLICATIONS

European Search Report received for EP Patent Application No. 19894845.7, dated Feb. 21, 2022, 15 pages.

ISA/KR, International Search Report and Written Opnion of the International Searching Authority, Int'l Appl. No. PCT/US2019/065875, dated Apr. 9, 2020, Korean Intellectual Property Office, Seo-gu, Daejeon, Republic of Korea, 14 pgs.

Kim et al., "All-Inclusive ECC: Thorough End-to-End Protection for Reliable Computer Memory," 2016 ACM/IEEE 43rd Annual International Symposium on Computer Architecture (ISCA), 2016, pp. 622-633, doi: 10.1109/ISCA.2016.60. (Year: 2016).

European Search Report and Search Opinion Received for EP Application No. 19894845.7, dated May 17, 2022, 18 pages.

* cited by examiner

DYNAMIC CONTROL OF ERROR MANAGEMENT AND SIGNALING

CROSS REFERENCE

The present application for patent is a continuation of U.S. patent application Ser. No. 16/711,354 by Richter et al., entitled "DYNAMIC CONTROL OF ERROR MANAGEMENT AND SIGNALING," filed Dec. 11, 2019, which claims priority to U.S. Provisional Patent Application No. 62/779,024 by Richter et al., entitled "DYNAMIC CONTROL OF ERROR MANAGEMENT AND SIGNALING," filed Dec. 13, 2018, each of which is assigned to the assignee hereof and each of which is expressly incorporated by reference in its entirety.

BACKGROUND

The following relates generally to a system that includes at least one memory device and more specifically to dynamic control of error management and signaling.

Memory devices are widely used to store information in various electronic devices such as computers, wireless communication devices, cameras, digital displays, and the like. Information is stored by programing different states of a memory device. For example, binary devices most often store one of two states, often denoted by a logic 1 or a logic 0. In other devices, more than two states may be stored. To access the stored information, a component of the device may read, or sense, at least one stored state in the memory device. To store information, a component of the device may write, or program, the state in the memory device.

Various types of memory devices exist, including magnetic hard disks, random access memory (RAM), read only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. Memory devices may be volatile or non-volatile. Non-volatile memory, e.g., FeRAM, may maintain their stored logic state for extended periods of time even in the absence of an external power source. Volatile memory devices, e.g., DRAM, may lose their stored state over time unless they are periodically refreshed by an external power source.

The integrity of data received and stored by memory devices may be affected by various conditions that may cause errors. For instance, a memory device may use one or more channels for receiving data from another device, and transient electronic noise may introduce one or more errors to the received data. In other cases, data may be affected after it is received at the memory device. Improved techniques for the detection and correction of errors in data and memory systems may be desired.

DETAILED DESCRIPTION

Figure 1:
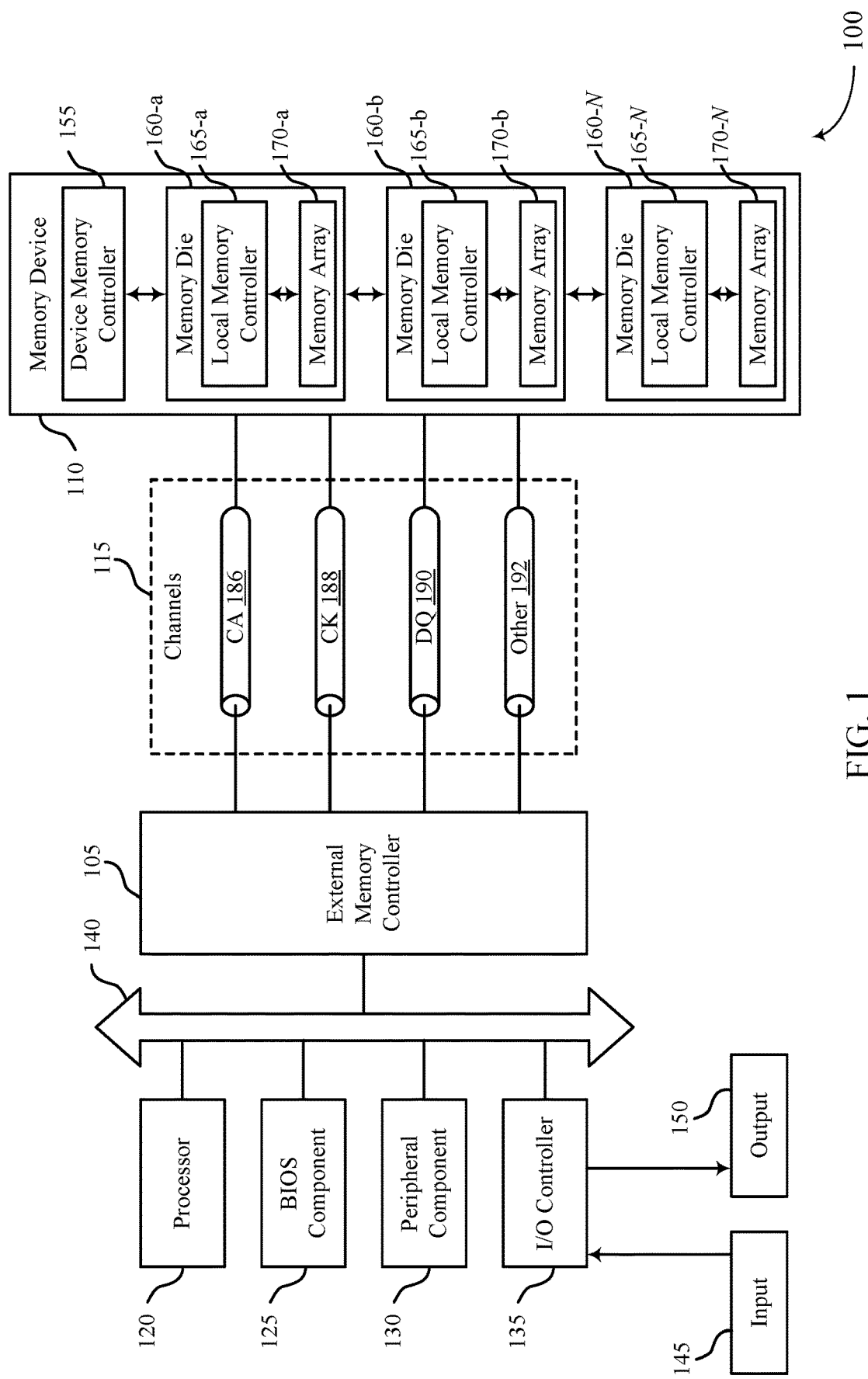
FIG. 1 illustrates an example of a system that supports dynamic control of error management and signaling as disclosed herein.

Memory systems and memory devices (such as dynamic random access memory (DRAM)) may be essential devices in modern computers, including personal computers (PCs), notebooks, servers, smart phones, automobiles, and the like. However, such systems may be susceptible to errors that may lead to failure within the system. Such failure may be attributed to unpredictable and transient electronic noise within the system, flaws in an operating system, or may be caused by other factors (e.g., electro-static shock, electro-mechanical failures), manufacturing defects, or the like. Further, a memory device may communicate with another device (e.g., a host device such as a controller, a graphics processing unit (GPU), general purpose GPU (GPGPU), central processing unit (CPU), or other device) over one or more communications channels, and errors may be introduced (e.g., randomly introduced) when data is transmitted over a channel (e.g., from electronic noise in and around the system).

In any case, the value of stored or transmitted information may be diminished by corruption or errors within the memory system. Although some memory devices may reliably receive and store data with low bit error rates, the bit error rate is unlikely to be zero due to physical limitations inherent in electronic devices. Errors in memory devices may correspond to a loss of stored data, either in a single memory cell (e.g., a bit flip), portions of the memory array (e.g., row and/or column defects), or the complete memory array, and such errors may be intermittent or persistent.

Moreover, some types of data in a memory system may be more crucial than other types of data, and failures associated with data having higher operational importance may thus have a greater impact on the system. As an example, failures in mission critical applications (such as autonomous driving systems and aerospace navigation, to name a few) may result in more serious complications than failures in video streaming applications that may result in, for example, a handful of off-colored pixels. Some systems (e.g., systems for self-driving cars) may accordingly include design parameters that tolerate memory failures up to a certain degree to keep the system operating due to the importance of continued operation (e.g., when injury or loss of life is at stake). As a result, different applications and operating conditions of a memory device may necessitate different error management techniques. Likewise, techniques that further improve error management, detection, correction, and reporting in a memory system may be desired.

As described herein, various techniques may be used to adapt a fault tolerance to a memory system's design parameters and a particular application. For example, safety circuits in memory devices may be enhanced by programmable error counts, error flag outputs, on-die address bus protection, command/address error detection code (e.g., parity bits, CRC), or temperature controlled internal refresh rates, or a combination thereof.

In some examples, a memory device may use error detection and correction (EDC) codes to protect against memory failures, where techniques (e.g., including those based on software algorithms) may be used to monitor for errors and take actions to correct failures. An internal counter may be used to count a quantity of detected errors, and the memory device may send a signal to a host device when an error threshold has been reached (e.g., based on the count). In some aspects, the memory device may be configured with the threshold quantity of errors that triggers reporting to the host device. Different thresholds may be configured for respective types of data, or for data stored within different portions of the memory device (e.g., per memory bank and/or other parts of the device), or both, among other examples. In some examples, the configurable threshold may be a threshold quantity of errors, a threshold frequency of errors, a threshold type of errors, a threshold of errors that are detected at one or more locations of the memory device, or any combination thereof. As such, the memory device may selectively issue reports of corrupted bits to a host device. In some cases, the memory device may check (e.g., autonomously check) and correct errors each time a cell (or word, row, etc.) is refreshed or when an access command is issued, or a combination thereof.

The host device may, in some cases, use the information received from the memory device to avoid portions of the memory array with high failure rates (as compared to other portions of the array). In such cases, the host device may continue using other, non-failing, portions of the memory array and thus retain much of the available memory capacity while ensuring continued operation. In some aspects, signals received from the memory device may trigger an interrupt at the host device, and the host device may analyze the failure and respond accordingly (e.g., by re-issuing commands). Accordingly, systems with high safety margins that tolerate low error rates, if at all, may set a programmable error threshold to trigger the interrupt and prevent errors from propagating through the system.

Additional techniques described herein include the identification of errors in information received at, and transmitted within, a memory device. For instance, a memory device may include logic for checking the integrity of a received command, where the transmission of the command may be secured by parity or other check bits. The memory device may respond with an indication of whether the received information included errors. In the case of a parity or checksum fail for the received command, the memory device may refrain from executing the received command (e.g., due to the detected errors) and report the error back to the host device. By refraining from executing an erroneous command, further errors in the system may be avoided. Additionally or alternatively, the memory device may enter a locked state to stop executing instructions received after an error is identified. The host device may identify the error, issue instructions to the memory device to release the locked state and retransmit the failing (and any later) commands.

In other examples, random errors (e.g., bit flips) may occur in transmitted addresses (e.g., memory bank, row, and/or column addresses), which may result in opening, accessing, or closing incorrect sections of the array. As a result, the memory device may apply EDC protection (e.g., parity, CRC) to internal buses, such as row and column address buses. The EDC protection applied to these buses may guard against errors for information transmitted within the device and further add a degree of protection against errors in the memory system.

Figure 2:
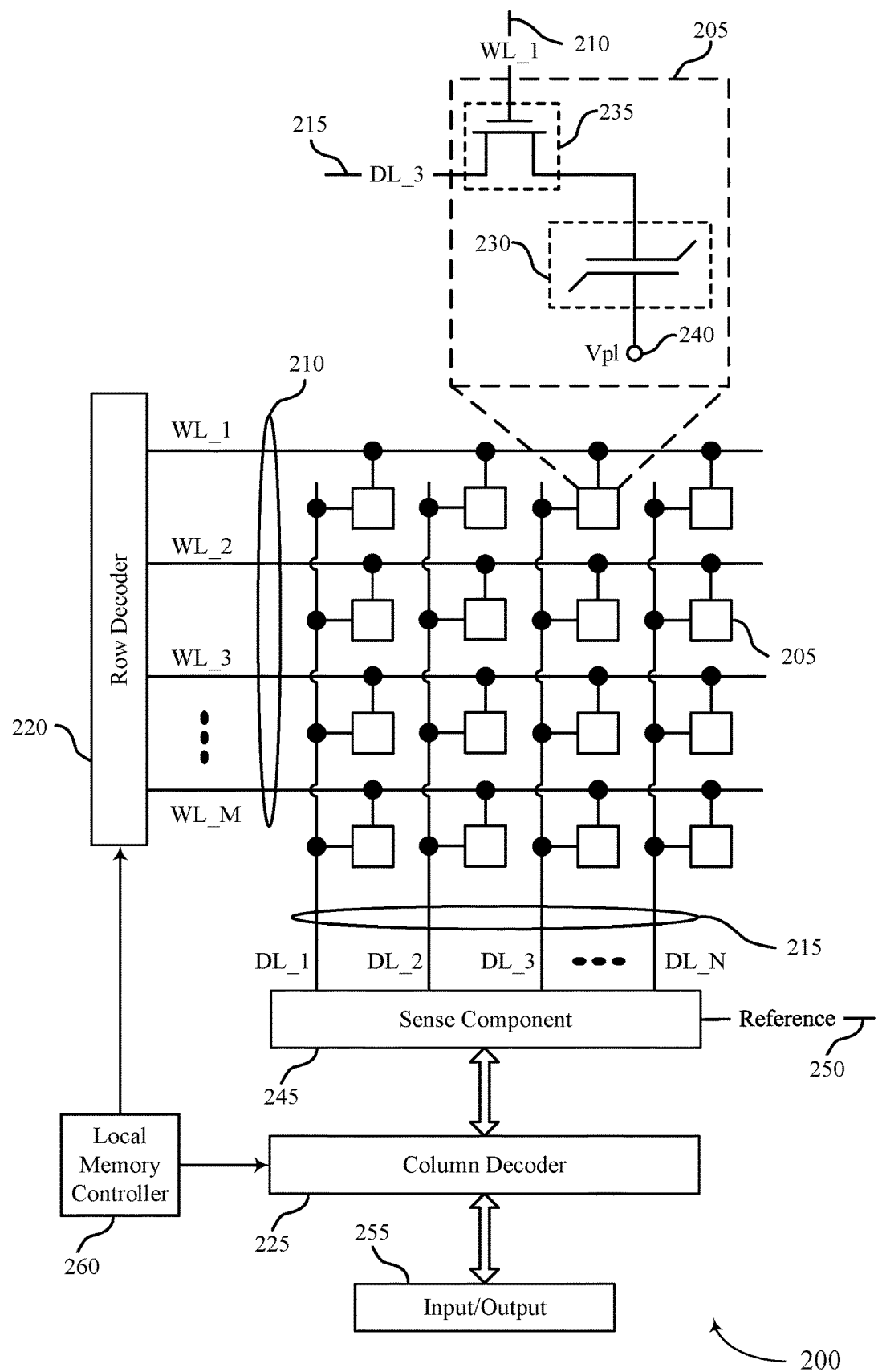
FIG. 2 illustrates an example of a memory die that supports dynamic control of error management and signaling as disclosed herein.

Features of the disclosure are described herein at an exemplary memory system level in the context of FIG. 1 and are further described with regard to an exemplary memory device in the context of FIG. 2. Specific examples of memory device and component block diagrams are then described in the context of FIGS. 3 and 4. These and other features of the disclosure are further illustrated by and described with reference to process flows of FIGS. 5 and 6 and flowcharts of FIGS. 7 through 10 that relate to techniques for the dynamic control of error management and signaling.

FIG. 1 illustrates an example of a system 100 that utilizes one or more memory devices in accordance with aspects disclosed herein. The system 100 may include an external memory controller 105, a memory device 110, and a plurality of channels 115 coupling the external memory controller 105 with the memory device 110. The system 100 may include one or more memory devices, but for ease of description the one or more memory devices may be described as a single memory device 110.

The system 100 may include aspects of an electronic device, such as a computing device, a mobile computing device, a wireless device, or a graphics processing device. The system 100 may be an example of a portable electronic device. The system 100 may be an example of a computer, a laptop computer, a tablet computer, a smartphone, a cellular phone, a wearable device, an internet-connected device, or the like. The memory device 110 may be component of the system configured to store data for one or more other components of the system 100. In some examples, the system 100 is configured for bi-directional wireless communication with other systems or devices using a base station or access point. In some examples, the system 100 is capable of machine-type communication (MTC), machine-to-machine (M2M) communication, or device-to-device (D2D) communication.

At least portions of the system 100 may be examples of a host device. Such a host device may be an example of a device that uses memory to execute processes such as a computing device, a mobile computing device, a wireless device, a graphics processing device, a computer, a laptop computer, a tablet computer, a smartphone, a cellular phone, a wearable device, an internet-connected device, a vehicle, some other stationary or portable electronic device, or the like. In some cases, the host device may refer to the hardware, firmware, software, or a combination thereof that implements the functions of the external memory controller 105. In some cases, the external memory controller 105 may be referred to as a host or host device. In some examples, system 100 is a graphics card. In some cases, a host device may determine a degree to which errors in data may be tolerated within the system (e.g., based on an application, type of data) and set a threshold quantity of errors based on the tolerance.

For instance, a memory system for autonomous driving may have a relatively low tolerance for errors compared to other applications or implementations. An error threshold may thus be set to allow few (or no) errors in data accessed and stored by the system. Alternatively, the host device may set a higher threshold of errors for data associated with, for example, video streaming or 3D graphics applications. In either case, the threshold quantity of errors for different types of data may be determined by the host device and dynamically enabled within the system.

In some cases, a memory device 110 may be an independent device or component that is configured to be in communication with other components of the system 100 and provide physical memory addresses/space to potentially be used or referenced by the system 100. In some examples, a memory device 110 may be configurable to work with at least one or a plurality of different types of systems 100. Signaling between the components of the system 100 and the memory device 110 may be operable to support modulation schemes to modulate the signals, different pin designs for communicating the signals, distinct packaging of the system 100 and the memory device 110, clock signaling and synchronization between the system 100 and the memory device 110, timing conventions, and/or other factors.

The memory device 110 may be configured to store data for the components of the system 100. In some cases, the memory device 110 may act as a slave-type device to the system 100 (e.g., responding to and executing commands provided by the system 100 through the external memory controller 105). Such commands may include an access command for an access operation, such as a write command for a write operation, a read command for a read operation, a refresh command for a refresh operation, or other commands. The memory device 110 may include two or more memory dice 160 (e.g., memory chips) to support a desired or specified capacity for data storage. The memory device 110 including two or more memory dice may be referred to as a multi-die memory or package (also referred to as multi-chip memory or package).

The system 100 may further include a processor 120, a basic input/output system (BIOS) component 125, one or more peripheral components 130, and an input/output (I/O) controller 135. The components of system 100 may be in electronic communication with one another using a bus 140.

The processor 120 may be configured to control at least portions of the system 100. The processor 120 may be a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In such cases, the processor 120 may be an example of a central processing unit (CPU), a graphics processing unit (GPU), a general purpose GPU (GPGPU), or a system on a chip (SoC), among other examples.

The BIOS component 125 may be a software component that includes a BIOS operated as firmware, which may initialize and run various hardware components of the system 100. The BIOS component 125 may also manage data flow between the processor 120 and the various components of the system 100, e.g., the peripheral components 130, the I/O controller 135, etc. The BIOS component 125 may include a program or software stored in read-only memory (ROM), flash memory, or any other non-volatile memory.

The peripheral component(s) 130 may be any input device or output device, or an interface for such devices, that may be integrated into or with the system 100. Examples may include disk controllers, sound controller, graphics controller, Ethernet controller, modem, universal serial bus (USB) controller, a serial or parallel port, or peripheral card slots, such as peripheral component interconnect (PCI) or accelerated graphics port (AGP) slots. The peripheral component(s) 130 may be other components understood by those skilled in the art as peripherals.

The I/O controller 135 may manage data communication between the processor 120 and the peripheral component(s) 130, input devices 145, or output devices 150. The I/O controller 135 may manage peripherals that are not integrated into or with the system 100. In some cases, the I/O controller 135 may represent a physical connection or port to external peripheral components.

The input 145 may represent a device or signal external to the system 100 that provides information, signals, or data to the system 100 or its components. This may include a user interface or interface with or between other devices. In some cases, the input 145 may be a peripheral that interfaces with system 100 via one or more peripheral components 130 or may be managed by the I/O controller 135.

The output 150 may represent a device or signal external to the system 100 configured to receive an output from the system 100 or any of its components. Examples of the output 150 may include a display, audio speakers, a printing device, or another processor on printed circuit board, and so forth. In some cases, the output 150 may be a peripheral that interfaces with the system 100 via one or more peripheral components 130 or may be managed by the I/O controller 135.

The components of system 100 may be made up of general-purpose or special purpose circuitry designed to carry out their functions. This may include various circuit elements, for example, conductive lines, transistors, capacitors, inductors, resistors, amplifiers, or other active or passive elements, configured to carry out the functions described herein.

The memory device 110 may include a device memory controller 155 and one or more memory dice 160. Each memory die 160 may include a local memory controller 165 (e.g., local memory controller 165-*a*, local memory controller 165-*b*, and/or local memory controller 165-N) and a memory array 170 (e.g., memory array 170-*a*, memory array 170-*b*, and/or memory array 170-N). A memory array 170 may be a collection (e.g., a grid) of memory cells, with each memory cell being configured to store at least one bit of digital data. Features of memory arrays 170 and/or memory cells are described in more detail with reference to FIG. 2.

In some cases, different types of data may be stored in different portions of the memory device 110. Additionally, some data may have higher or lower priority within the system and respective sets of data may accordingly be stored, for example, in different memory arrays 170 (e.g., based on a reliability of the location where the data is being stored relative to the priority of the data). As an illustrative example, data associated with mission critical operations (e.g., highly sensitive data, data essential to operations of a system, data essential to operations of a business or organization) may be stored in memory array 170-*a*, whereas data associated with less critical operations (e.g., data associated with media streaming, data for three-dimensional (3D) graphics rending or gaming) may be stored in memory array 170-*b*. Likewise, a first type of data may be stored at memory die 160-*a* and a second type of data may be stored at memory die 160-*b*. Additionally or alternatively, different types of data may be stored at different dual in-line memory modules (DIMMs). Other examples of storing different types of data in respective portions of a memory device 110 not explicitly described herein are also contemplated and fall within the scope of the concepts disclosed herein.

The memory device 110 may be an example of a two-dimensional (2D) array of memory cells or may be an example of a 3D array of memory cells. For example, a 2D memory device may include a single memory die 160. A 3D memory device may include two (2) or more memory dice 160 (e.g., memory die 160-*a*, memory die 160-*b*, and/or any quantity of memory dice 160-N). In a 3D memory device, a plurality of memory dice 160-N may be stacked on top of one another. In some cases, memory dice 160-N in a 3D memory device may be referred to as decks, levels, layers, or dies. A 3D memory device may include any quantity of stacked memory dice 160-N (e.g., two high, three high, four high, five high, six high, seven high, eight high). This may increase the quantity of memory cells that may be positioned on a substrate as compared with a single 2D memory device, which in turn may reduce production costs or increase the performance of the memory array, or both. In some 3D memory device, different decks may share at least one common access line such that some decks may share at least one of a word line, a digit line, and/or a plate line.

The device memory controller 155 may include circuits or components configured to control operation of the memory device 110. As such, the device memory controller 155 may include the hardware, firmware, and software that enables the memory device 110 to perform commands and may be configured to receive, transmit, or execute commands, data, or control information related to the memory device 110. The device memory controller 155 may be configured to communicate with the external memory controller 105, the one or more memory dice 160, or the processor 120. In some cases, the memory device 110 may receive data and/or commands from the external memory controller 105. For example, the memory device 110 may receive a write command indicating that the memory device 110 is to store certain data on behalf of a component of the system 100 (e.g., the processor 120) or a read command indicating that the memory device 110 is to provide certain data stored in a memory die 160 to a component of the system 100 (e.g., the processor 120). In some cases, the device memory controller 155 may control operation of the memory device 110 described herein in conjunction with the local memory controller 165 of the memory die 160. Examples of the components included in the device memory controller 155 and/or the local memory controllers 165 may include receivers for demodulating signals received from the external memory controller 105, decoders for modulating and transmitting signals to the external memory controller 105, logic, decoders, amplifiers, filters, or the like.

In some cases, the device memory controller 155 may perform functions to detect and/or correct errors in data at the memory device 110. As an example, the device memory controller 155 may use an error detecting code to identify errors in commands received from the external memory controller 105. In other cases, the device memory controller 155 may use an error detecting code associated with a set of buses of the memory device 110 to identify errors in, for example, an address (e.g., a bank, row, and/or column address) for storing and obtaining data. In some cases, the device memory controller 155 may also correct errors identified in data retrieved from the memory arrays 170 using an error correcting code. The device memory controller may count the quantity of errors and/or quantity of corrections performed and may report the count to the external memory controller 105. The device memory controller 155 may also determine if a threshold quantity of errors for data has been satisfied, and if so, may enter the memory device 110 into a locked state that refrains from executing additional commands. In some examples, the device memory controller 155 may refrain from reporting correctable errors while reporting uncorrectable errors to the external memory controller 105.

The local memory controller 165 (e.g., local to a memory die 160) may be configured to control operations of the memory die 160. Also, the local memory controller 165 may be configured to communicate (e.g., receive and transmit data and/or commands) with the device memory controller 155. The local memory controller 165 may support the device memory controller 155 to control operation of the memory device 110 as described herein. In some cases, the memory device 110 does not include the device memory controller 155, and the local memory controller 165 or the external memory controller 105 may perform the various functions described herein. As such, the local memory controller 165 may be configured to communicate with the device memory controller 155, with other local memory controllers 165, or directly with the external memory controller 105 or the processor 120. In some example, the local memory controller 165 may detect and count errors for data included in a respective memory array 170. For instance, each error identified in data at a memory device 110 may increment a counter, and an error count may be maintained by the memory device 110. In some examples, the error count may be communicated to the device memory controller 155, and an aggregate or separate error count from each memory die 160 or each memory array 170, or a combination thereof, may be reported to the external memory controller 105.

The external memory controller 105 may be configured to enable communication of information, data, and/or commands between components of the system 100 (e.g., the processor 120) and the memory device 110. The external memory controller 105 may act as a liaison between the components of the system 100 and the memory device 110 so that the components of the system 100 may not need to know the details of the memory device's operation. The components of the system 100 may present requests to the external memory controller 105 (e.g., read commands or write commands) that the external memory controller 105 satisfies. The external memory controller 105 may convert or translate communications exchanged between the components of the system 100 and the memory device 110. In some cases, the external memory controller 105 may include a system clock that generates a common (source) system clock signal. In some cases, the external memory controller 105 may include a common data clock that generates a common (source) data clock signal.

In some cases, the external memory controller 105 or other component of the system 100, or its functions described herein, may be implemented by the processor 120. For example, the external memory controller 105 may be hardware, firmware, or software, or some combination thereof implemented by the processor 120 or other component of the system 100. While the external memory controller 105 is depicted as being external to the memory device 110, in some cases, the external memory controller 105, or its functions described herein, may be implemented by a memory device 110. For example, the external memory controller 105 may be hardware, firmware, or software, or some combination thereof implemented by the device memory controller 155 or one or more local memory controllers 165. In some cases, the external memory controller 105 may be distributed across the processor 120 and the memory device 110 such that portions of the external memory controller 105 are implemented by the processor 120 and other portions are implemented by a device memory controller 155 or a local memory controller 165. Likewise, in some cases, one or more functions ascribed herein to the device memory controller 155 or local memory controller 165 may in some cases be performed by the external memory controller 105 (either separate from or as included in the processor 120). In some examples, the external memory controller 105 may perform functions to manage and correct errors within the memory device 110. For instance, should the memory device 110 report that a programmed threshold quantity of errors has been satisfied, the external memory controller 105 may determine that a portion of the memory device 110 including the erroneous data may be avoided for later access operations. As a result, the external memory controller 105 may write/read data to/from different portions of the memory device 110.

The components of the system 100 may exchange information with the memory device 110 using a plurality of channels 115. In some examples, the channels 115 may enable communications between the external memory controller 105 and the memory device 110. Each channel 115 may include one or more signal paths or transmission mediums (e.g., conductors) between terminals associated with the components of system 100. For example, a channel 115 may include a first terminal including one or more pins or pads at external memory controller 105 and one or more pins or pads at the memory device 110. A pin may be an example of a conductive input or output point of a device of the system 100, and a pin may be configured to act as part of a channel.

In some cases, a pin or pad of a terminal may be part of to a signal path of the channel 115. Additional signal paths may be coupled with a terminal of a channel for routing signals within a component of the system 100. For example, the memory device 110 may include signal paths (e.g., signal paths internal to the memory device 110 or its components, such as internal to a memory die 160) that route a signal from a terminal of a channel 115 to the various components of the memory device 110 (e.g., a device memory controller 155, memory dice 160, local memory controllers 165, memory arrays 170).

Channels 115 (and associated signal paths and terminals) may be dedicated to communicating specific types of information. In some cases, a channel 115 may be an aggregated channel and thus may include multiple individual channels. For example, a data channel 190 may be ×4 (e.g., including four signal paths), ×8 (e.g., including eight signal paths), ×16 (including sixteen signal paths), and so forth.

In some cases, the channels 115 may include one or more command and address (CA) channels 186. The CA channels 186 may be configured to communicate commands between the external memory controller 105 and the memory device 110 including control information associated with the commands (e.g., address information). For example, the CA channel 186 may include a read command with an address of the desired data. In some cases, the CA channels 186 may be registered on a rising clock signal edge and/or a falling clock signal edge. In some cases, a CA channel 186 may include multiple signal paths.

In some cases, the channels 115 may include one or more clock signal (CK) channels 188. The CK_channels 188 may be configured to communicate one or more common clock signals between the external memory controller 105 and the memory device 110. Each clock signal may be configured to oscillate between a high state and a low state and coordinate the actions of the external memory controller 105 and the memory device 110. In some cases, the clock signal may be a differential output (e.g., a CK_t signal and a CK_c signal) and the signal paths of the CK channels 188 may be configured accordingly. In some cases, the clock signal may be single ended. A CK channel 188 may include any quantity of signal paths. In some cases, the clock signal CK (e.g., a CK_t signal and a CK_c signal) may provide a timing reference for command and addressing operations for the memory device 110, or other system-wide operations for the memory device 110. The clock signal CK therefore may be variously referred to as a control clock signal CK, a command clock signal CK, or a system clock signal CK. The system clock signal CK may be generated by a system clock, which may include one or more hardware components (e.g., oscillators, crystals, logic gates, transistors, or the like).

In some cases, the channels 115 may include one or more data (DQ) channels 190. The data channels 190 may be configured to communicate data and/or control information between the external memory controller 105 and the memory device 110. For example, the data channels 190 may communicate information (e.g., bi-directional) to be written to the memory device 110 or information read from the memory device 110. The data channels 190 may communicate signals that may be modulated using a variety of different modulation schemes (e.g., NRZ, PAM4). In some cases, the channels 115 may include one or more other channels 192 that may be dedicated to other purposes. These other channels 192 may include any quantity of signal paths.

In some cases, the other channels 192 may include one or more write clock signal (WCK) channels. While the 'W' in WCK may nominally stand for "write," a write clock signal WCK (e.g., a WCK_t signal and a WCK_c signal) may provide a timing reference for access operations generally for the memory device 110 (e.g., a timing reference for both read and write operations). Accordingly, the write clock signal WCK may also be referred to as a data clock signal WCK. The WCK channels may be configured to communicate a common data clock signal between the external memory controller 105 and the memory device 110. The data clock signal may be configured to coordinate an access operation (e.g., a write operation or read operation) of the external memory controller 105 and the memory device 110. In some cases, the write clock signal may be a differential output (e.g., a WCK_t signal and a WCK_c signal) and the signal paths of the WCK channels may be configured accordingly. A WCK channel may include any quantity of signal paths. The data clock signal WCK may be generated by a data clock, which may include one or more hardware components (e.g., oscillators, crystals, logic gates, transistors, or the like). In some cases, the other channels 192 may include one or more EDC channels. The EDC channels may be configured to communicate error detection signals, such as checksums, to improve system reliability. An EDC channel may include any quantity of signal paths. In some cases, an EDC channel may be used to transmit an error flag based on an error threshold being satisfied.

The channels 115 may couple the external memory controller 105 with the memory device 110 using a variety of different architectures. Examples of the various architectures may include a bus, a point-to-point connection, a crossbar, a high-density interposer such as a silicon interposer, or channels formed in an organic substrate or some combination thereof. For example, in some cases, the signal paths may at least partially include a high-density interposer, such as a silicon interposer or a glass interposer.

Signals communicated over the channels 115 may be modulated using a variety of different modulation schemes. In some cases, a binary-symbol (or binary-level) modulation scheme may be used to modulate signals communicated between the external memory controller 105 and the memory device 110. A binary-symbol modulation scheme may be an example of a M-ary modulation scheme where M is equal to two. Each symbol of a binary-symbol modulation scheme may be configured to represent one bit of digital data (e.g., a symbol may represent a logic 1 or a logic 0). Examples of binary-symbol modulation schemes include, but are not limited to, non-return-to-zero (NRZ), unipolar encoding, bipolar encoding, Manchester encoding, pulse amplitude modulation (PAM) having two symbols (e.g., PAM2), and/or others.

In some cases, a multi-symbol (or multi-level) modulation scheme may be used to modulate signals communicated between the external memory controller 105 and the memory device 110. A multi-symbol modulation scheme may be an example of a M-ary modulation scheme where M is greater than or equal to three. Each symbol of a multi-symbol modulation scheme may be configured to represent more than one bit of digital data (e.g., a symbol may represent a logic 00, a logic 01, a logic 10, or a logic 11). Examples of multi-symbol modulation schemes include, but are not limited to, PAM4, PAM8, etc., quadrature amplitude modulation (QAM), quadrature phase shift keying (QPSK), and/or others. A multi-symbol signal or a PAM4 signal may be a signal that is modulated using a modulation scheme that includes at least three levels to encode more than one bit of information. Multi-symbol modulation schemes and symbols may alternatively be referred to as non-binary, multi-bit, or higher-order modulation schemes and symbols.

Memory devices 110 may be essential components in modern computers or devices having computers, including PCs, notebooks, servers, smart phones, vehicles, and the like. However, such devices may be susceptible to errors that lead to data failures. Data failures may be attributed to unpredictable and transient electronic noise, flaws in an operating system, electro-static shock, electro-mechanical failures, manufacturing defects, and so on. Further, a memory device 110 may communicate with a host device, such as an external memory controller 105, over one or more channels 115, and errors may be introduced when data is transmitted over a channel 115 (e.g., from electronic noise in and around system 100). In any event, the value of stored or transmitted information at a memory device 110 may be diminished by errors. Errors in memory devices 110 may correspond to loss of stored data in a single memory cell (e.g., a bit flip), or parts of the memory array (e.g., row and/or column defect), or a complete memory array 170, or a combination thereof. Such errors may also be intermittent or persistent. Further, although some memory devices 110 may receive and store data with relatively low bit error rates, the physical limitations of a memory device 110 may result in some level of transient errors experienced during operation.

In some cases, if an error or data loss occurs within memory, a host device may not have knowledge of that error, and the system may continue to operate with corrupted data. Errors may also occur as a memory device 110 ages and its components degrade. In other examples, errors may be caused by properties related to internal buses of a memory device 110 (e.g., a size of the buses, defects in construction) and charges that may accumulate on these internal buses. Additionally, an error that occurs in an access command (e.g., read commands, write commands) may lead to cascading failures in the system 100. For instance, errors in an access command may lead to a range of issues, from a bit flip to a write command being incorrectly executed as a read command. Moreover, if later commands are received at the memory device 110 after a command including an error, there may be some data that is overwritten, and the host device (or the memory device 110) may be unable to identify the error or its cause.

In some cases, certain failures may be more serious than others based on the use case (e.g., application) of the memory system. For instance, system 100 may be used for mission critical operations having a low error tolerance. Autonomous driving applications (e.g., self-driving cars, robotic cars, driverless vehicles) may be one example of such mission critical operations, and the integrity of data in the system, as well as continued operation of the system, may have high importance (as compared to a personal computer (PC) or a tablet used for web browsing). These systems may have complex operations that continually manage data for various sensors, inputs, and components, where the data may be used to make real-time computations and decisions on the operation of the vehicle (e.g., acceleration, speed, relative location to other objects and people, navigation). Further, even within the same application, errors that occur at different times (e.g., driving on an interstate versus sitting idle at a traffic signal) may have different levels of impact. Thus, not only do different applications influence how errors may be handled in a system, different operating conditions may require different error management techniques. It should be noted that autonomous driving is used herein as one illustrative example of a system configured for mission critical operations, but other such systems and operations are considered.

System 100 may support techniques that enable the dynamic management of errors for data at a memory device 110. For example, programmable thresholds may be configured for a memory device 110 based on a type of data, or a location of stored data, or a combination thereof. A host device may program a threshold of errors for data at the memory device 110, and the memory device 110 may count detected errors in the data (e.g., upon reading data from a memory array) to determine whether the threshold has been satisfied. The memory device 110 may transmit, to the host device, an indication that the threshold has been satisfied and functions may then be performed to correct the errors and/or prevent further errors. For instance, the memory device 110 may enter a locked state upon determining that the threshold of errors has been satisfied. In this state, the memory device 110 may not execute any later commands received from the host. However, the host device may use the received indication of the errors to determine whether the errors are correctable (e.g., such as if the corrupted data is stored in another, redundant, location). If so, the host device may transmit an indication to the memory device 110 to exit the locked state and retransmit the data. In other examples, the host device may receive an indication of a junction temperature from the memory device 110, and the host device may adjust operational parameters of the memory device to assist in mitigating errors, such as increasing a refresh rate of the memory device 110 or reducing an operating frequency of the memory device 110. In other cases, the memory device may autonomously adjust the refresh rate based on the detected errors.

The memory device 110 may also identify errors in received commands. In such cases, an error detecting code (e.g., parity bits, cyclic redundancy check (CRC) bits) may be included with a command transmitted by the host device. The memory device 110 may use the error detecting code to determine if the command includes one or more errors. In cases where no errors are detected, the memory device 110 may indicate as much to the host device (where the host device may store a set of transmitted commands, and a particular command may be removed from storage once an indication is received that the command was error free). If, however, the command includes errors, the memory device 110 may refrain from executing the received command, enter the locked state, and may transmit an indication of the errors to the host device. As a result, the host device may retransmit the command based on the received indication.

Additionally or alternatively, the memory device 110 may identify errors associated with a command using EDC for internal buses of the memory device 110. That is, signals generated responsive to a command (e.g., bank/row/column addresses) may also utilize protection mechanisms, such as an error detecting code, to identify errors. The use of EDC protection for the internal buses of the memory device 110 may ensure that, even though a command, data, or both, may have been received without error, later errors when associated signals are propagated through the memory device 110 may be timely and efficiently identified and mitigated.

System 100 may thus support the use of flexible error counting and reporting by a memory device 110 based on a type of data accessed. In this way, errors in data associated with some operations may be handled with higher priority than other operations, and the system 100 may adaptively configure different threshold for different operations and applications. In some aspects, the programmable thresholds and corresponding techniques to correct and prevent future errors may enable continued functionality in the system 100, where actions may be taken to ensure data is stored and retrieved from portions of memory that operate with minimal errors. For instance, instead of stopping the operation or resetting the system 100 when a failure occurs, steps may be taken to slow the performance to recover and/or correct failures to avoid complete system failure. For complex operations, this may mean adjusting a memory bandwidth to allow additional time to perform functions for retuning the system to a stable (error-free) state while still processing data with the memory device 110. In the above example of autonomous driving, this may mean that a vehicle temporarily slows down while the memory system mitigates detected errors, which may prevent the complete and sudden loss of one or more systems or components of the vehicle due to a failure-induced system reset. In other examples, the signaling of the errors identified in system 100 may also trigger user intervention.

Further, system 100 may be configured for selectively enabling and disabling the described data protection mechanisms. As such, the same memory device 110 may be used for different applications and/or in different systems while achieving customizable levels of reliability and memory bandwidth (e.g., based on the application/system). For instance, there may be a tradeoff between techniques that enhance data integrity and the speed at which the data is stored and retrieved by a memory device 110, which may be configured based on a given application. For instance, some applications may allow for an acceptable performance drop if there are no errors in the memory, while for other applications, performance may be more vital than the quantity of errors. However, some combination of the described aspects may be dynamically enabled to achieve a programmable balance of error management and memory bandwidth, among other factors, for a given system.

FIG. 2 illustrates an example of a memory die 200 that supports the dynamic control of error management and signaling in accordance with aspects disclosed herein. The memory die 200 may be an example of the memory dice 160 described with reference to FIG. 1. In some cases, the memory die 200 may be referred to as a memory chip, a memory device, or an electronic memory apparatus. The memory die 200 may include one or more memory cells 205 that are programmable to store different logic states. Each memory cell 205 may be programmable to store two or more states. For example, the memory cell 205 may be configured to store one bit of digital logic at a time (e.g., a logic 0 and a logic 1). In some cases, a single memory cell 205 (e.g., a multi-level memory cell) may be configured to store more than one bit of digit logic at a time (e.g., a logic 00, logic 01, logic 10, or a logic 11).

A memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed.

Operations such as reading and writing may be performed on memory cells 205 by activating or selecting access lines such as a word line 210 and/or a digit line 215. In some cases, digit lines 215 may also be referred to as bit lines. References to access lines, word lines and digit lines, or their analogues, are interchangeable without loss of understanding or operation. Activating or selecting a word line 210 or a digit line 215 may include applying a voltage to the respective line.

The memory die 200 may include the access lines (e.g., the word lines 210 and the digit lines 215) arranged in a grid-like pattern. Memory cells 205 may be positioned at intersections of the word lines 210 and the digit lines 215. By biasing a word line 210 and a digit line 215 (e.g., applying a voltage to the word line 210 or the digit line 215), a single memory cell 205 may be accessed at their intersection.

Accessing the memory cells 205 may be controlled through a row decoder 220 or a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address. For example, the memory die 200 may include multiple word lines 210, labeled WL_1 through WL_M, and multiple digit lines 215, labeled DL_1 through DL_N, where M and N depend on the size of the memory array. Thus, by activating a word line 210 and a digit line 215, e.g., WL_1 and DL_3, the memory cell 205 at their intersection may be accessed. The intersection of a word line 210 and a digit line 215, in either a two-dimensional or three-dimensional configuration, may be referred to as an address of a memory cell 205. In some cases, information such as CRC or parity bits may be included with the addresses received by the row decoder 220 or the column decoder 225. In such cases, the address may be checked to identify any errors to ensure the correct word line 210 and digit line 215 are accessed in response to the received address. Such techniques may reduce or minimize errors in accessing the memory cells 205 with minimal overhead.

The memory cell 205 may include a logic storage component, such as capacitor 230 and a switching component 235. The capacitor 230 may be an example of a dielectric capacitor or a ferroelectric capacitor. A first node of the capacitor 230 may be coupled with the switching component 235 and a second node of the capacitor 230 may be coupled with a voltage source 240. In some cases, the voltage source 240 may be the cell plate reference voltage, such as Vpl, or may be ground, such as Vss. In some cases, the voltage source 240 may be an example of a plate line coupled with a plate line driver. The switching component 235 may be an example of a transistor or any other type of switch device that selectively establishes or de-establishes electronic communication between two components.

Selecting or deselecting the memory cell 205 may be accomplished by activating or deactivating the switching component 235. The capacitor 230 may be in electronic communication with the digit line 215 using the switching component 235. For example, the capacitor 230 may be isolated from digit line 215 when the switching component 235 is deactivated, and the capacitor 230 may be coupled with digit line 215 when the switching component 235 is activated. In some cases, the switching component 235 is a transistor and its operation may be controlled by applying a voltage to the transistor gate, where the voltage differential between the transistor gate and transistor source may be greater or less than a threshold voltage of the transistor. In some cases, the switching component 235 may be a p-type transistor or an n-type transistor. The word line 210 may be in electronic communication with the gate of the switching component 235 and may activate/deactivate the switching component 235 based on a voltage being applied to word line 210.

A word line 210 may be a conductive line in electronic communication with a memory cell 205 that is used to perform access operations on the memory cell 205. In some architectures, the word line 210 may be in electronic communication with a gate of a switching component 235 of a memory cell 205 and may be configured to control the switching component 235 of the memory cell. In some architectures, the word line 210 may be in electronic communication with a node of the capacitor of the memory cell 205 and the memory cell 205 may not include a switching component.

A digit line 215 may be a conductive line that connects the memory cell 205 with a sense component 245. In some architectures, the memory cell 205 may be selectively coupled with the digit line 215 during portions of an access operation. For example, the word line 210 and the switching component 235 of the memory cell 205 may be configured to couple and/or isolate the capacitor 230 of the memory cell 205 and the digit line 215. In some architectures, the memory cell 205 may be in electronic communication (e.g., constant) with the digit line 215.

The sense component 245 may be configured to detect a state (e.g., a charge) stored on the capacitor 230 of the memory cell 205 and determine a logic state of the memory cell 205 based on the stored state. The charge stored by a memory cell 205 may be extremely small, in some cases. As such, the sense component 245 may include one or more sense amplifiers to amplify the signal output by the memory cell 205. The sense amplifiers may detect small changes in the charge of a digit line 215 during a read operation and may produce signals corresponding to a logic state 0 or a logic state 1 based on the detected charge. During a read operation, the capacitor 230 of memory cell 205 may output a signal (e.g., discharge a charge) to its corresponding digit line 215. The signal may cause a voltage of the digit line 215 to change. The sense component 245 may be configured to compare the signal received from the memory cell 205 across the digit line 215 to a reference signal 250 (e.g., reference voltage). The sense component 245 may determine the stored state of the memory cell 205 based on the comparison. For example, in binary-signaling, if digit line 215 has a higher voltage than the reference signal 250, the sense component 245 may determine that the stored state of memory cell 205 is a logic 1 and, if the digit line 215 has a lower voltage than the reference signal 250, the sense component 245 may determine that the stored state of the memory cell 205 is a logic 0. The sense component 245 may include various transistors or amplifiers to detect and amplify a difference in the signals. The detected logic state of memory cell 205 may be output through column decoder 225 as output 255. In some cases, the sense component 245 may be part of another component (e.g., a column decoder 225, row decoder 220). In some cases, the sense component 245 may be in electronic communication with the row decoder 220 or the column decoder 225.

The local memory controller 260 may control the operation of memory cells 205 through the various components (e.g., row decoder 220, column decoder 225, and sense component 245). The local memory controller 260 may be an example of the local memory controller 165 described with reference to FIG. 1. In some cases, one or more of the row decoder 220, column decoder 225, and sense component 245 may be co-located with the local memory controller 260. The local memory controller 260 may be configured to receive commands and/or data from an external memory controller 105 (or a device memory controller 155 described with reference to FIG. 1), translate the commands and/or data into information that can be used by the memory die 200, perform one or more operations on the memory die 200, and communicate data from the memory die 200 to the external memory controller 105 (or the device memory controller 155) in response to performing the one or more operations. The local memory controller 260 may generate row and column address signals to activate the target word line 210 and the target digit line 215. The local memory controller 260 may also generate and control various voltages or currents used during the operation of the memory die 200. In general, the amplitude, shape, or duration of an applied voltage or current discussed herein may be adjusted or varied and may be different for the various operations discussed in operating the memory die 200.

In some cases, the local memory controller 260 may be configured to perform a write operation (e.g., a programming operation) on one or more memory cells 205 of the memory die 200. During a write operation, a memory cell 205 of the memory die 200 may be programmed to store a desired logic state. In some cases, a plurality of memory cells 205 may be programmed during a single write operation. The local memory controller 260 may identify a target memory cell 205 on which to perform the write operation. The local memory controller 260 may identify a target word line 210 and a target digit line 215 in electronic communication with the target memory cell 205 (e.g., the address of the target memory cell 205). The local memory controller 260 may activate the target word line 210 and the target digit line 215 (e.g., applying a voltage to the word line 210 or digit line 215), to access the target memory cell 205. The local memory controller 260 may apply a specific signal (e.g., voltage) to the digit line 215 during the write operation to store a specific state (e.g., charge) in the capacitor 230 of the memory cell 205, the specific state (e.g., charge) may be indicative of a desired logic state.

In some cases, the local memory controller 260 may be configured to perform a read operation (e.g., a sense operation) on one or more memory cells 205 of the memory die 200. During a read operation, the logic state stored in a memory cell 205 of the memory die 200 may be determined. In some cases, a plurality of memory cells 205 may be sensed during a single read operation. The local memory controller 260 may identify a target memory cell 205 on which to perform the read operation. The local memory controller 260 may identify a target word line 210 and a target digit line 215 in electronic communication with the target memory cell 205 (e.g., the address of the target memory cell 205). The local memory controller 260 may activate the target word line 210 and the target digit line 215 (e.g., applying a voltage to the word line 210 or digit line 215), to access the target memory cell 205. The target memory cell 205 may transfer a signal to the sense component 245 in response to biasing the access lines. The sense component 245 may amplify the signal. The local memory controller 260 may fire the sense component 245 (e.g., latch the sense component) and thereby compare the signal received from the memory cell 205 to the reference signal 250. Based on that comparison, the sense component 245 may determine a logic state that is stored on the memory cell 205. The local memory controller 260 may communicate the logic state stored on the memory cell 205 to the external memory controller 105 (or the device memory controller 155) as part of the read operation. In some cases, a value of errors in data accessed during a read operation may be counted. Further, and as described herein, a programmable threshold of errors (e.g., a dynamic threshold, a non-static threshold) may be configured for the memory device. Accordingly, the local memory controller 260 may determine if the quantity of counted errors has been satisfied and may transmit an indication that the threshold was reached if so. In some cases, the programmable threshold may be selectively adjusted based on the type of data being accessed during the read operation. Additionally or alternatively, multiple thresholds may be configured for respective types of data stored in the memory cells 205.

In some memory architectures, accessing the memory cell 205 may degrade or destroy the logic state stored in a memory cell 205. For example, a read operation performed in DRAM architectures may partially or completely discharge the capacitor of the target memory cell. The local memory controller 260 may perform a re-write operation or a refresh operation to return the memory cell to its original logic state. The local memory controller 260 may re-write the logic state to the target memory cell after a read operation. In some cases, the re-write operation may be considered part of the read operation.

Figure 3:
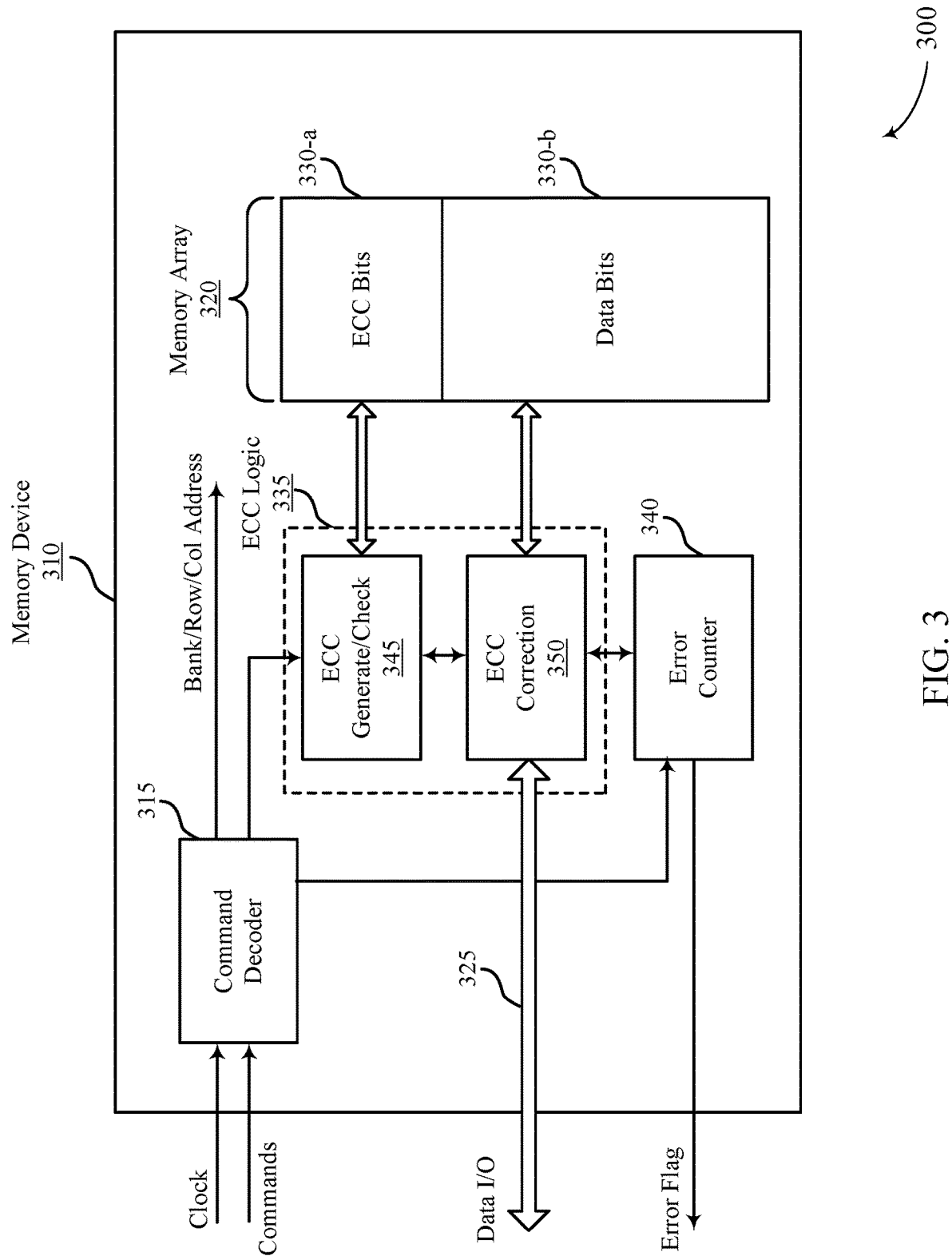
FIG. 3 illustrates a block diagram of a memory device that supports dynamic control of error management and signaling as disclosed herein.

FIG. 3 illustrates a block diagram 300 of a memory device 310 that supports the dynamic control of error management and signaling in accordance with aspects disclosed herein. The memory device 310 may be an example of a memory device 110 as described with reference to FIG. 1. In some examples, the memory device 310 may include one or more components that support enhanced detection and correction of errors (e.g., in data). The memory device 310 may include a command decoder 315, a memory array 320, data input/output (I/O) 325, error correcting code (ECC) logic 335, and an error counter 340. In some cases, the memory device may be configured to perform error detection and correction based on operating conditions of the system that the memory device 310 is included in, where different conditions may be associated with different degrees of error management.

The command decoder 315 may be configured to control processes performed by the memory device 310. As an example, the command decoder 315 may be configured to receive signals, such as a clock signal and one or more commands, where the commands may include write commands or read commands transmitted by a controller. In some examples, the command decoder 315 may be coupled with other components of the memory device 310, such as a column decoder (such as a column decoder 225 described with reference to FIG. 2), or a row decoder (such as a row decoder 220 described with reference to FIG. 2), or a combination thereof. The command decoder 315 may decode received commands and transmit signals to other components of the memory device 310. For instance, the command decoder 315 may generate and transmit an address (e.g., a memory bank address, a row address, a column address) for storing or acquiring data in the memory array 320 in accordance with a write or read command. Further, data may be transmitted from and/or received at the memory device 310 on the data I/O 325. For example, the command may include a write command, and data may be received at the memory device 310 via the data I/O 325 and stored at the memory array 320. Alternatively, the command may include a read command, and data may be read from the memory array 320 and later transmitted to another device (e.g., a controller) via the data I/O 325.

In some cases, the memory device 310 may be configured to detect and/or correct various errors (e.g., using EDC codes). For example, the ECC logic 335 may perform various functions on data at the memory device 310, and the ECC logic may use signals received from the command decoder 315 and data from the memory array 320 to manage the detection and/or correction of errors. The ECC logic 335 may include an ECC generation and checking component 345 and an ECC correction component 350 that perform respective functions on the data that is received and transmitted via the data I/O 325.

For instance, in cases where a write command may be received at the command decoder 315, data received via the data I/O 325 may be written to the memory array 320 without modification. Additionally, the ECC generation and checking component 345 may produce a set of ECC bits for the data received via the data I/O 325, and the ECC bits may be written to and stored at the memory array 320. In some cases, the memory array 320 may include different portions used for storing different types of information, or may include redundant memory cells, banks, and/or arrays to enhance data management and error protection (e.g., by providing locations where backup or supporting data may be stored). For example, the memory array 320 may include a first portion 330-$a$ used for storing generated ECC bits, while a second portion 330-$b$ may be used for storing the data received via the data I/O 325.

In response to a read command, data may be read from the memory array 320 (e.g., array 320-$b$) and the ECC generation and checking component 345 and the ECC correction component 350 may check the read data for errors by computing a checksum using the ECC bits stored in the array 320-$b$. More specifically, ECC bits may be read from the array 320-$b$, where the ECC bits may correspond to data that may be read from the array 320-$b$. The error logic 335 may then check the read data against the ECC bits to identify any errors in the read data. In some cases, any identified errors may be corrected using the ECC bits, before the read data is transmitted via the data I/O 325. Such techniques may sometimes be referred to as on-die ECC.

In some examples, the memory device 310 may be part of a system used for mission critical applications (e.g., servers, self-driving automobiles), and EDC codes may be used to protect against memory failures. For example, the memory device 310 may use software algorithms that monitor memory failures and take action to correct the failures, up to and including recommending a replacement of a dysfunctional device. In such cases, the memory device 310 may correct failures (e.g., single cell failures) and provide corrected data during an access operation (e.g., a read operation). Further, the memory device 310 may have an error counter 340 to count the quantity of detected and/or corrected errors. The memory device 310 may report this count (e.g., using an indication or a flag) upon request, such as after receiving a command. In other examples, the memory device 310 may autonomously transmit the indication of the quantity of errors counted at the error counter 340, such as when an error threshold has been satisfied.

In some aspects, the on-die ECC implemented by the memory device 310 may be enhanced by programmable error thresholds, or error flag outputs, or on-die address bus protection, or command/address parity or CRC, or temperature controlled internal refresh rates, or a combination thereof. In some cases, the memory device 310 may per functions in response to detected errors, such as error correction, signaling to a host device, termination of a command, etc., where the functions may be based on operating conditions of the memory device 310. In some cases, the memory device 310 may selectively transmit reports of corrupted bits, where single failures may not be reported, but a quantity of failures above an error threshold may trigger signaling to the host device. In some cases, the memory device 310 may implement a protocol that allows the correction of data errors, where the error correction may be associated with additional signaling. For instance, the memory device may identify an error and issue a signal to a memory controller or host device to take corrective action.

In some cases, the programmable error threshold may be configured for the memory device 310. For instance, a host device may determine a threshold quantity of errors that is allowable based on a particular application or operation. The memory device 310 may be configured with the threshold quantity of errors, and the memory device 310 may determine that, once the threshold quantity of errors has been reached (e.g., based on a count generated by the error counter 340), an error flag may be signaled to the host device to indicate that the threshold has been satisfied. Additionally or alternatively, the programmable error threshold may be a threshold frequency of errors, for example, where a set of errors counted by the error counter 340 may occur often enough (e.g., within a period of time) that a threshold frequency of errors may be satisfied. In some examples, the error threshold may be maximum error count for a type of error (e.g., single memory cell errors, multiple memory cell errors). In other cases, the error threshold may be a threshold of errors identified at a location of the memory device 310 (e.g., a threshold of errors that occur at a particular bank of the memory device 310). The error threshold may also be configured by the host device to include a combination of different thresholds. For instance, the error threshold may be a threshold quantity of a first type of error, or may be a threshold of errors that occur at a first bank of the memory device 310 in excess of a threshold frequency. Additionally or alternatively, the error threshold may be a threshold type of error that is detected at a particular location of the memory device 310. In any event, the memory device 310 may include additional or different components than those illustrated to determine that a set of errors satisfies the error threshold.

Further, the error threshold may be programmable by the host device or memory controller, where different types of data, or data stored in different locations in memory, or both, may be configured with different error thresholds. For example, systems with strict safety margins may tolerate low error rates, if at all, and a programmable error count for data associated with the system's operation may be set based on the safety margins. The memory device 310 may also be programmed to refrain from reporting some errors that satisfy the threshold while reporting others. For instance, the memory device 310 may be configured to refrain from reporting correctable failures (e.g., single cell failures) while still reporting non-correctable failures (such as double or multi-cell errors).

The signal transmitted to a host device when an error threshold has been reached may trigger one or more actions, such as an interrupt, at the host device. The interrupt may allow the host device to analyze the failure and respond accordingly (e.g., by re-issuing commands). After the interrupt, the host may know where errors were previously identified, and may determine which portions of the memory to write data to. Alternatively, if writing to a portion of memory that previously had errors, the host device may determine to use a redundant portion of the memory device 310 to ensure there is backup/protection for the data being written to a location that may be susceptible to failures.

In addition to counting a quantity of errors in data, the memory device 310 may count the quantity of failures within a portion of the memory array 320 (e.g., per memory bank and/or other parts of the memory device 310). The memory device 310 may report the quantity of errors for a given portion of the memory array 320, and a host may use this information, for example, to disregard or avoid areas of the memory array 320 with high failure rates (as compared to other portions of the memory array 320). The host device may continue using other non-failing portions of the memory array 320 (or portions having a relatively lower bit error rate) and thus retain much of the available capacity of the memory device 310. In some cases, the memory device 310 may check and correct errors each time a cell (or word, row, etc.) is refreshed. Additionally or alternatively, error checking and correction may occur when a read command is received.

In some cases, the memory device 310 may use the error threshold to change (e.g., autonomously increase or autonomously adjust) an internal refresh rate, which may be based on a quantity of counted errors (e.g., satisfying configured threshold(s)) at the memory device 310. For example, the memory device 310 may refresh twice as many cells per refresh command initiated, which may provide a degree of error management and prevention. In some aspects, the memory device 310 may transmit a temperature of one or more portions or components to the host device to aid in error management. As an example, the memory device 310 may transmit an indication of a junction temperature, where the temperature indication may be transmitted within an error indication/flag to the host device (e.g., responsive to a threshold being reached) or in a separate signal. The host device may accordingly take measures to reduce the reported junction temperature. For instance, a temperature sensor may be used to determine if a portion of the memory device 310 has become too hot (e.g., higher than optimal) through the operation of the memory device 310. In such cases, a refresh rate may be modified (e.g., doubled or otherwise increased) based on the reported junction temperature at the memory device 310. Additionally or alternatively, an operating frequency of the memory device 310 may be lowered to reduce the temperature of the memory device 310. Other techniques may also be used to reduce the reported temperature of the memory device 310.

Additional techniques described herein may be utilized to identify errors in information received from a host device. For instance, the ECC logic 335 of memory device 310 may be configured to check the integrity of a command received at the command decoder 315. In such cases, the transmission of the command may be secured by a parity or other check bits. That is, additional bits associated with an error detecting code may be included in the transmitted command. Should the received command be error free, the memory device 310 may execute the command, and may also signal an indication to the host device that the command did not include errors.

Alternatively, in the case of a parity or checksum fail, the memory device 310 may not execute the received command (e.g., due to the detected errors) and report the error to the host device. In some cases, the memory device 310 may also enter a different state (e.g., locked state) and stop executing later instructions received from the host device. Upon identifying the error, the host device may issue a command to the memory device 310 to release the state (e.g., the locked state), and the host device may retransmit the failing (and any later) commands. Such techniques may retain the integrity of data stored at the memory device 310.

In other cases, the memory device 310 may apply an error detecting code (e.g., parity or CRC protection) to internal buses, such as row and column address buses. Random errors (e.g., bit flips) may occur in a transmitted bank, row, and column addresses, which may result in opening, accessing, or closing incorrect sections of the array. The error detecting code applied to these buses may protect the buses against such errors and add an additional degree of error protection. In some examples, a trigger for applying the error detecting code to internal buses may be based on a signal from the host device or other factors, including a threshold quantity of errors detected in data read from the memory device 310 or a particular application in use, or a combination thereof.

A host device may analyze failures and errors reported by the memory device and determine a corrective action to take. As an example, the host device may determine to refrain from using a particular memory bank in a set of memory banks or may determine to only use a portion of the memory device 310. In cases where the corrective actions taken to avoid or disable memory devices 310 that cause or regularly experience errors lead to a loss of system performance, a system may gradually disable optional features to keep mandatory (e.g., mission critical) features alive. In some cases, the host device may use a received indication as a trigger to perform additional operations, such a service routine to identify the cause of and/or solutions to the indicated failures.

In some examples, checking and reporting errors may take time and reduce bandwidth (e.g., an average memory bandwidth). As such, logic in the memory device 310 may be used to enable and disable the various security features described herein, which may be based on the error tolerance of an application or data. For example, critical program code may not tolerate any failures, and each of the security features described herein may all be enabled. Conversely, pixel data may not be considered as critical (pixel failures may hardly be detected, and pixel data may be overwritten or replaced in a memory device 310 at relatively high rates (e.g., 60 frames per second) regardless). In some cases, an application may leverage the maximum bandwidth supported by the memory device 310 and the error detection, correction, and management schemes described herein may thus be disabled.

Additionally or alternatively, some combination of the described techniques may be dynamically enabled or disabled at the memory device 310. More generally, some applications may use more bandwidth, so may implement fewer error management techniques, whereas other application may have a greater importance for reliability and data integrity, so memory bandwidth may not be as important. As a result, a same memory device 310 may be used for various applications or systems without the need to customize the memory device 310 per application or per system. The memory device 310 may thus be used for a wide range of cases (from a PC to an automobile), which may avoid manufacturing and design costs for specialized memory systems.

Figure 4:
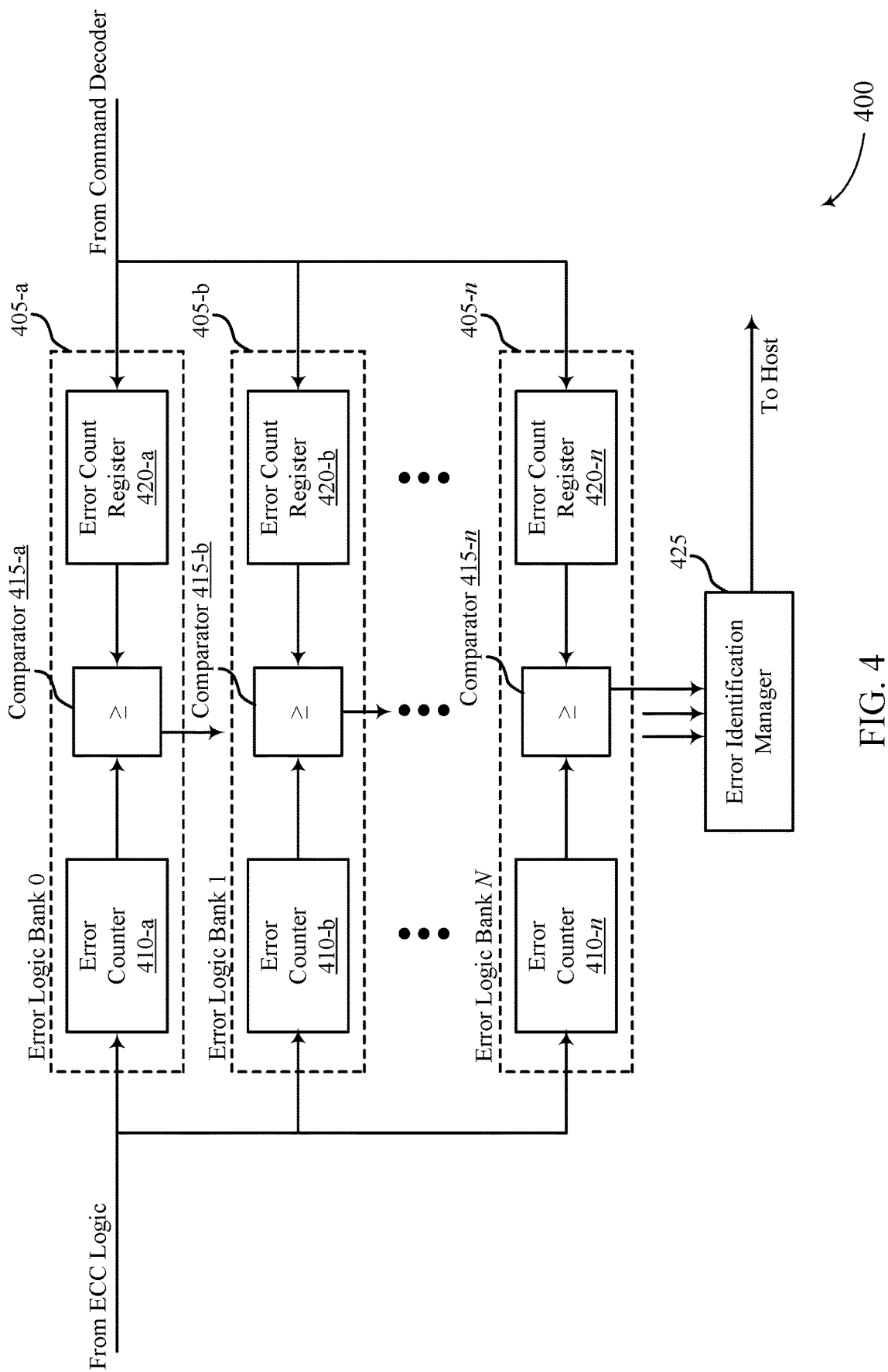
FIG. 4 illustrates a block diagram of an error management component that supports dynamic control of error management and signaling as disclosed herein.

FIG. 4 illustrates a block diagram of an error management component 400 that supports the dynamic control of error management and signaling in accordance with aspects disclosed herein. The error management component 400 may be an example of a component of a memory device, such as a memory device 110 described with reference to FIG. 1 or a memory device 310 described with reference to FIG. 3. In some examples, the error management component 400 may be an example of an error counter 340 as described with reference to FIG. 3. The error management component 400 may support the use of respective error thresholds for different memory banks. As such, the error management component 400 may include multiple error logic banks 405 (e.g., error logic banks 405-*a* through 405-*n*) that correspond to respective portions (e.g., memory bank, array) of a memory device.

Each error logic bank 405 may include an error counter 410, a comparator 415, and an error count register 420 (which may store values of one or more bits that represent a maximum error count (i.e., a threshold)). As an example, a first error logic bank 405-*a* may include a first error counter 410-*a*, a first comparator 415-*a*, and a first error count register 420-*a*, where the first error counter 410-*a*, first comparator 415-*a*, and the first error count register 420-*a* perform error counting functions for data retrieved from a first memory bank. Similarly, a second error logic bank 405-*b* may include a second error counter 410-*b*, a second comparator 415-*b*, and a second error count register 420-*b* for a second memory bank. A maximum error count (e.g., a threshold of errors) for each error logic bank 405 may be written to the respective error count registers 420, for example, by a command decoder (such as a command decoder 315 as described with reference to FIG. 3). Additionally or alternatively, a central register may hold the respective thresholds for each error logic bank 405.

In some examples, the maximum error count may be individually configured for each error logic bank 405 based on the sensitivity of the stored data in the corresponding portion of memory. As an example, a host device may configure the first error logic bank 405-*a* with a first threshold of errors and configure the second error logic bank 405-*b* with a second threshold of errors. In some cases, the configured threshold of errors may be based on the type of data stored at respective portions of the memory device. As an example, the first error logic bank 405-*a* may be associated with a memory bank that includes mission-critical data (e.g., data associated with high-priority applications/operations), whereas the second error logic bank 405-*b* may be associated with a memory bank that includes image, music, or video data. Accordingly, the first threshold may be configured lower than the second threshold due to more strict tolerances on the mission critical data. In some cases, through the use of the described per-bank error threshold, each bank may be dynamically adjusted based on the application of the memory device.

In some cases, each error logic bank 405 may have a first (e.g., default) maximum error count, and a host device may modify the first (e.g., default) maximum error count for respective error logic banks 405 based on data written to the corresponding memory bank. For instance, a default maximum error count may be some preconfigured quantity. In other cases, a default configuration may be that the memory device does not have a threshold quantity of errors for each memory bank and a configuration may update each error count register 420 with a threshold quantity of errors. In some examples, the maximum error count for each error count register 420 may be configured using a lookup table, among other examples. As an example, a configuration may notify the memory device of a particular lookup table which indicates which thresholds may be set for each error logic bank 405. In some cases, different lookup tables may be utilized for different applications.

When retrieving data from a portion of memory, an error counter 410 may detect and count the quantity of errors in the data. The count may be incremented with each error detected. Additionally, the quantity of errors may be signaled to a comparator 415 by the error counter 410, and the comparator 415 may compare the error count to the maximum error count threshold received from the error count register 420 (e.g., by calculating a difference between a current error count and the maximum error count). The results of the comparison may then be passed to an error identification manager 425. Accordingly, each comparator 415-a, 415-b, through 415-n may transmit the results of its own comparison to the error identification manager 425.

The error identification manager 425 may determine, based on the signals received from each comparator 415, whether one or more of the error logic banks 405 counted an error that satisfies the maximum error threshold for that error logic bank 405. In some cases, the error identification manager 425 may implement Boolean logic, such as an OR operation, to determine if one or more of the comparators 415 detected an error count that satisfied the threshold of errors. For instance, the outputs of the comparators 415-a through 415-n are OR'ed, and if the maximum error count of any of the N error logic banks 405 is exceeded, the error identification manager 425 may determine that a set of errors satisfies a configured threshold. It should be noted that the OR operation is one example of the logic that may be implemented by the error identification manager 425, and different logic or algorithms may be used to determine if the error threshold was satisfied by the one or more error logic banks 405.

In cases where a maximum error count has been reached, the error identification manager 425 may transmit an indication to a host device that a threshold has been satisfied, and may provide further information, such as the error logic bank (and the memory bank) associated with the error. For example, the information sent to the host device may include various degrees of granularity, such as information for each address that failed or a general indication that a failure occurred at the memory device. The host device may use this information to analyze the failure and determine how to correct the failure, or minimize further failures, or both. In other cases, the memory device may correct errors in the data retrieved from the memory bank, but the host device may be aware of the corrected errors based on the signaling from the error identification manager 425.

In some examples, the memory device may be configured to determine which errors to report to the host device. For instance, the memory device may identify a set of errors in one or more error logic banks 405, and based on the type of data, the location of the data, or a combination thereof, among other examples, the memory device may determine which errors to report to the host device. Additionally or alternatively, the host device may be informed if any error logic banks 405 (e.g., error logic banks 405-a through 405-n) have errors that satisfy a respective threshold. The host device may also configure the memory device such that the host is notified of certain errors (e.g., double cell errors, errors of a first type) and not other errors (e.g., errors of a second type). As such, a configuration may dynamically modify which errors are signaled by the memory devices, which may reduce signaling overhead within the system.

Such techniques may also be used to avoid locking the memory device when lower-priority data fails, particularly if that type of data may be corrected. In some cases, if errors are initially detected in a particular bank, a threshold may be adjusted for that bank, one or more other banks, or both based on the errors. For example, if it appears that a memory bank is failing based on error detection, a lower threshold may be set to ensure that errors are caught sooner, such that a host device may determine to avoid using that memory bank.

Figure 5:
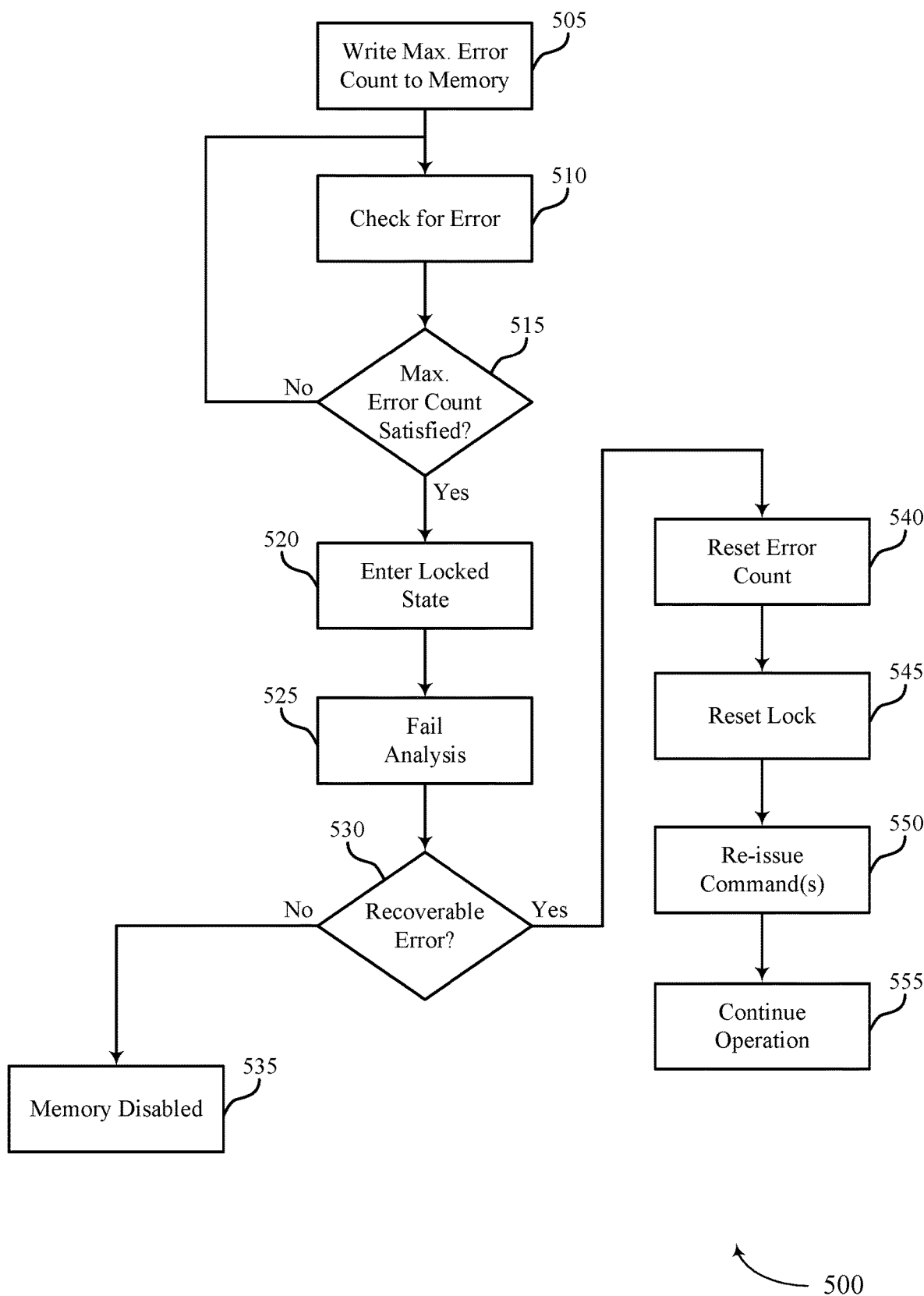
FIGS. 5 and 6 illustrate examples of process flows in a system that supports dynamic control of error management and signaling as disclosed herein.

FIG. 5 shows a process flow 500 in a system that supports the dynamic control of error management and signaling in accordance with aspects disclosed herein. In some examples, aspects of the process flow 500 may be implemented by a host device (e.g., a controller) and a memory device, which may be examples of the corresponding devices described with reference to FIG. 1. However, the operations and aspects described herein are not limited to use of these components, and other alternatives are specifically contemplated and fall within the scope of the concepts disclosed herein. The process flow may illustrate features of a programmable error threshold and processes used to correct errors and prevent further errors in the system.

At 505, a host device may determine a value of an error count, such as a maximum error count as one example, and may configure a memory device with the value. For instance, the host device may write the value of the error threshold into a memory device's registers (such as one or more mode registers or the error count registers 420 described with reference to FIG. 4). The maximum error count may correspond to a threshold of errors for a particular type of data (e.g., mission critical data), or a threshold of errors for data stored within a portion of a memory device (e.g., a particular memory bank). In some cases, the configuration of the thresholds and the behavior of the memory device may be adaptable during operation of the memory device.

At 510, the memory device may check for errors in data retrieved from a memory array. For example, as part of a read operation, the memory device may retrieve data from one or more memory arrays and may utilize EDC to identify one or more errors in the retrieved data. In some cases, the memory device may utilize ECC to identify and correct errors detected in the data (e.g., using the ECC logic described with reference to FIG. 3). When errors are identified, the memory device may increment an error counter. In particular, the memory device may check data for errors each time the data is read from memory. If there is an error, the error count may be compared with the maximum allowable error count (e.g., the error threshold). In some cases, the memory device may report the error count in response to a received command (e.g., from the host device).

At 515, the memory device may determine whether the count of errors satisfies the configured threshold received from the host device at 505. If the error count does not satisfy the threshold (e.g., the quantity of errors is less than the threshold), the memory device may continue to monitor data retrieved from a memory array and detect errors within the data. The memory device may accordingly continue to increment the error count in the event any other errors are detected.

If the error count does satisfy the configured threshold (e.g., the quantity of errors is greater than or equal to the threshold), the memory device may transmit, to the host device, an indication that the threshold has been satisfied. In some cases, the signal sent to the host device may include information associated with the errors detected at the memory device.

As an example, the information may include an indication of the data that encountered the error, or the location of the data that was retrieved, a time at which a failure occurred (e.g., based on a clock signal), or the like. In some cases, at 520 the memory device may enter a locked state based on the maximum error count being satisfied. The locked state may preserve the state of the memory so that errors can be identified and for corrective action to be taken to prevent further errors. The locked state may include performing a self-refresh to ensure that no further data in memory is lost. In some examples, the memory device may report, to the host device, that the memory device has entered the locked state. The indication of the locked state may be transmitted with the indication that the threshold has been satisfied or may be transmitted separately to the host device. In some cases, the locked state may include a self-refresh state. In the locked state, the memory device may close all memory banks and stop executing commands.

At 525, the host device may perform an analysis of the reported error(s) and determine the cause of the failure. In some examples, the host may analyze the status of the errors, for example, by reading the information received from the memory device. The failure analysis performed by the host device may aid in a determination of how to manage the encountered errors (such as adjusting a refresh rate, or operational frequency, or both). Further, at 530, the host device may determine whether the errors are recoverable based on the information received from the memory device. A recoverable error may be an error that may be corrected through the retransmission of the data that failed. In other examples, the recoverable error may be data corruption that may be corrected through ECC. Recoverable data may also include data that may be stored with a level of redundancy and may be acquired from another location of the memory device (or another memory device).

If the host detects an unrecoverable failure, it may disable the memory device (or parts of the memory device). For example, at 535 the memory device may be disabled based on the unrecoverable errors identified in the signaling from the memory device, and the host device may later use a different memory device for further access operations. Such techniques may enable a system to remain in operation while avoiding portions of memory that are associated with data errors.

Alternatively, the host device may determine that the error is recoverable, and the host device may reset the error count. For example, at 540 the host device may reset the error count in one or more error banks (such as the error banks described with reference to FIG. 4). At 545, the host device may reset the lock based on the recoverable errors. In such cases, the host device may transmit signaling or a command to the memory device to transition out of the locked state.

At 550, the host device may re-issue commands (e.g., from the moment in time when the fail occurred, for a duration before the fail occurred until after the fail occurred). For example, the error may have been detected in response to a first access command, and additional access commands may have been later issued by the host device. However, because the memory device entered the locked state at 520, the additional access commands may have been disregarded or not executed based on the previously-detected errors satisfying the threshold. Accordingly, the host device may re-issue the first command and/or the additional commands at 550.

At 555, the system and host device may continue operation. For example, the memory device may continue to receive and execute commands from the host device. When a read command is received, the memory device may check for errors as it did at 510, may determine whether a maximum error count has been satisfied such as at 515, and so forth.

Figure 6:
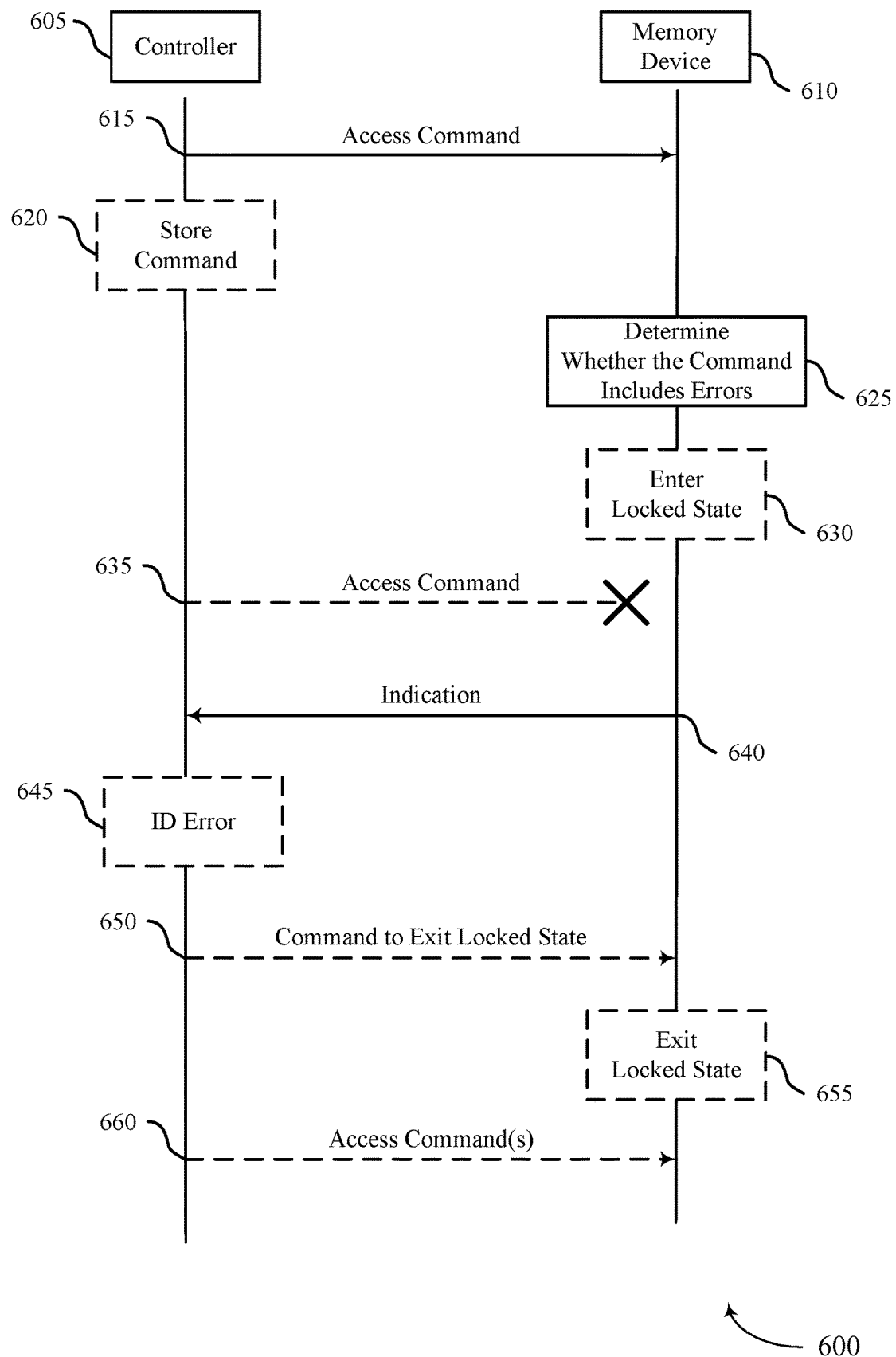

FIG. 6 shows a process flow 600 in a system that supports the dynamic control of error management and signaling in accordance with aspects disclosed herein. In some examples, aspects of process flow 600 may be implemented by a controller 605 and a memory device 610, which may be examples of the corresponding devices described with reference to FIG. 1. The disclosure herein is not limited to examples that include a controller, or a memory device, or both. The operations and aspects described herein are not limited to use of these components, and other alternatives are contemplated. Process flow 600 may illustrate the use of EDC protection for commands received at a memory device.

At 615, the controller 605 may transmit an access command to the memory device 610. In some cases, the transmitted command may include one or more bits used to check the integrity of the command when it is received by the memory device 610. For instance, the access command may include an error detection code that includes one or more parity or other check bits.

At 620, the controller 605 may optionally store commands transmitted to the memory device 610. As an example, the controller 605 may store the last M commands that were sent to the memory device 610, where the commands may be retained until the controller 605 receives an indication that the commands were received without error (e.g., based on the error detecting code included with each command). In some cases, the commands may be buffered by the controller 605 when transmitted to the memory device 610.

At 625, the memory device 610 may determine whether the access command includes an error based on the error detection code associated with the access command. For instance, the memory device may perform a parity check or checksum on the received command. If the parity check or checksum passes, then it may be determined that the command was received without errors. Alternatively, if the parity check fails, it may be determined that the command was received with errors.

In cases where the access command includes errors, the memory device may optionally enter into a locked state at 630. As such, the memory device may refrain from executing any further access commands. For instance, the controller may transmit a second access command at 635, but because the memory device is in the locked state, the second access command may not be executed. In some cases, the controller 605 may not be aware of the error until an indication is received from the memory device 610.

At 640, the memory device 610 may transmit, to the controller 605, an indication of whether an error was detected in the access command based on the access command and the determination. For example, the memory device 610 may transmit an indication that the access command is error free based on the determination at 625. In such cases, the memory device may execute the access command based on the determination that the access command does not include an error. In this way, the controller may receive the indication that the access command was received without errors at the memory device 610, in which case a stored version of the transmitted command may be removed from storage at the controller 605.

Alternatively, the memory device 610 may transmit an indication that the access command includes one or more errors based on the determination at 625. In such cases, the controller 605 may identify the error with the access command at 645, which may be based on the indication received from the memory device 610. For example, the memory device 610 may include, in the indication, information about the error, how the error was detected in the received access command, when the access command was received, etc. As such, the controller 605 may determine that the error is correctable, for example, through the retransmission of the same command. Accordingly, at 650, the controller 605 may transmit a request to the memory device 610 to exit the locked state.

Upon exiting the locked state at 655, the memory device 610 may be capable of receiving additional instruction from the controller 605. At 660, the controller 605 may retransmit the access command (e.g., the command sent at 615) as well as any later commands that may not have been executed due to the locked state of the memory device 610 (e.g., the command sent at 635). In such cases, the memory device 610 may continue operations, including checking received access commands for errors using a set of check bits, and the memory device may provide signaling that indicates whether the access commands were received without errors.

Figure 7:
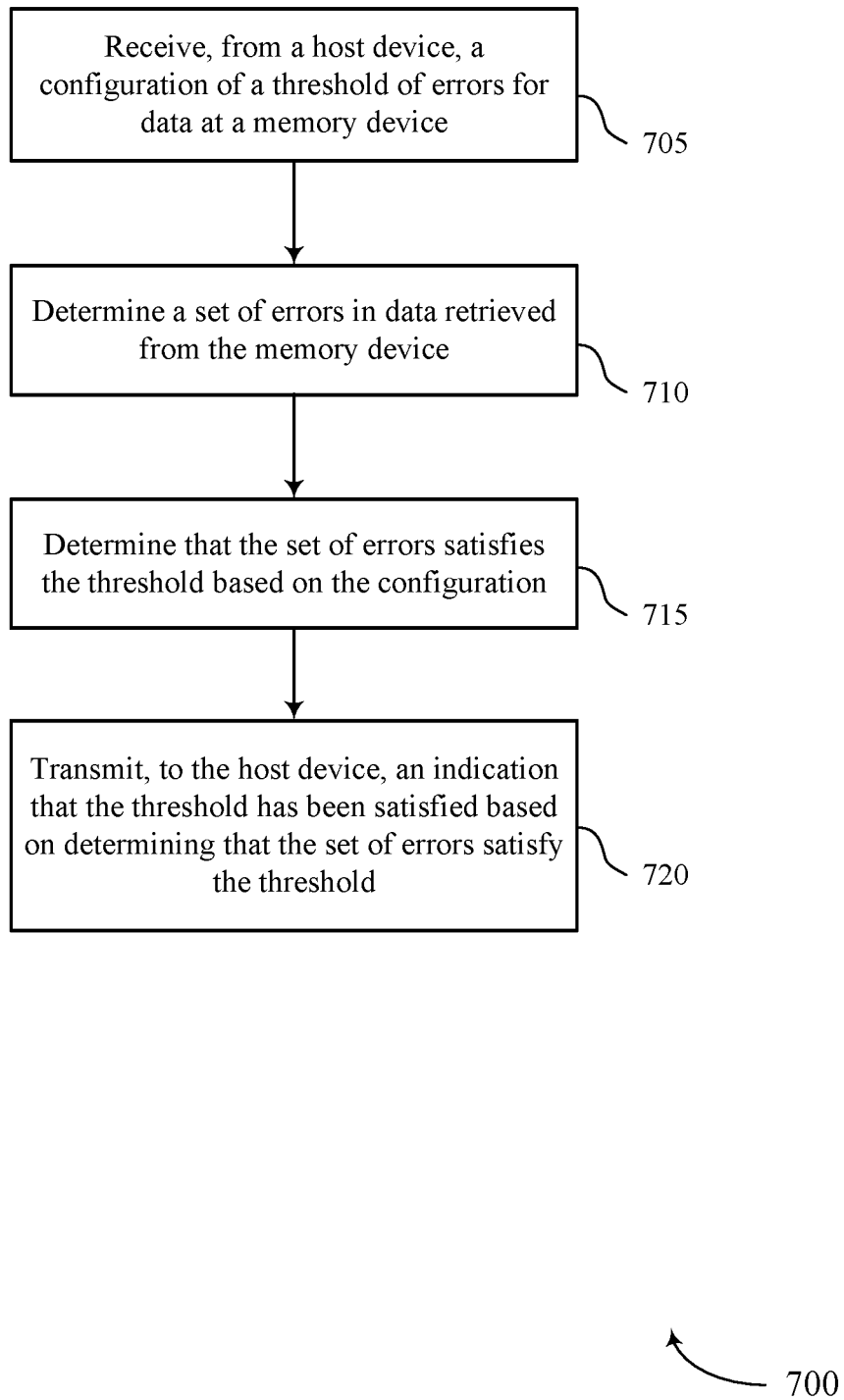
FIGS. 7 through 10 show flowcharts illustrating a method or methods that support the dynamic control of error management and signaling as disclosed herein.

FIG. 7 shows a flowchart illustrating a method 700 that supports the dynamic control of error management and signaling in accordance with aspects disclosed herein. The operations of method 700 may be implemented by a memory device or its components as described with reference to FIGS. 1-6. For example, the operations of method 700 may be performed by a memory device 310 as described with reference to FIG. 3 or a memory device 610 as described with reference to FIG. 6. In some examples, the memory device may execute a set of instructions or codes to control the functional elements of the memory device to perform the functions described herein.

At 705, the memory device may receive, from a host device (e.g., a controller), a configuration of a threshold of errors for data at the memory device. For example, the configuration of the threshold of errors may indicate a maximum quantity of errors for a particular type of data, or data stored at a particular location of the memory device, or a combination thereof. In this way, the programmable threshold may be set differently for data associated with different operations, thereby enabling dynamic and controllable techniques for managing data failures in memory devices. The operations of 705 may be performed according to the methods described with reference to FIGS. 1-6.

At 710, the memory device may determine a set of errors in data retrieved from the memory device. For example, when obtaining data from one or more memory arrays (e.g., responsive to an access command), the memory device may identify one or more errors in the retrieved data (e.g., using an error detection code). The memory device may accordingly count the identified one or more errors. Additionally or alternatively, the memory device may identify and correct the errors (e.g., using error correcting code) and count the quantity of corrected errors in the data. The operations of 710 may be performed according to the methods described with reference to FIGS. 1-6.

At 715, the memory device may determine that the set of errors satisfies the threshold based on the configuration. In such cases, the memory device may compare the counted errors in the data with the configured threshold received from the host device. As such, if the identified set of errors satisfy the configured threshold, the memory device may determine that the errors have exceed an allowable quantity of failures for the data or the location where the data is stored. The operations of 715 may be performed according to the methods described with reference to FIGS. 1-6.

At 720, the memory device may transmit, to the host device, an indication that the threshold has been satisfied based on determining that the set of errors satisfy the threshold. In some examples, the memory device may transmit the indication responsive to determining that the threshold of errors has been satisfied. Additionally or alternatively, the memory device may transmit the indication response to an associated command received from the host device. The operations of 720 may be performed according to the methods described with reference to FIGS. 1-6.

In some examples, an apparatus as described herein may perform a method or methods, such as the method 700. The apparatus may include features, means, or instructions (e.g., a non-transitory computer-readable medium storing instructions executable by a processor) for receiving, from a host device, a configuration of a threshold of errors for data at a memory device, determining a set of errors in data retrieved from the memory device, determining that the set of errors satisfies the threshold based on the configuration, and transmitting, to the host device, an indication that the threshold has been satisfied based on determining that the set of errors satisfy the threshold.

Some examples of the method 700, apparatuses, and non-transitory computer-readable medium described herein may further include operations, features, means, or instructions for receiving, from the host device, a command to transmit the indication that the threshold may have been satisfied, where the indication may be transmitted in response to the command.

Some examples of the method 700, apparatuses, and non-transitory computer-readable medium described herein may further include operations, features, means, or instructions for detecting the set of errors for a bank of the memory device (e.g., a memory bank), where determining that the set of errors satisfy the threshold may be based on detecting the set of errors for the bank, and transmitting an indication of the set of errors to the host device.

Some examples of the method 700, apparatuses, and non-transitory computer-readable medium described herein may further include operations, features, means, or instructions for incrementing a counter for each error of the set of errors in the data based on determining the set of errors, and operating, based on incrementing the counter for each error of the set of errors, the memory device in a first mode that refrains from executing access commands.

Some examples of the method 700, apparatuses, and non-transitory computer-readable medium described herein may further include operations, features, means, or instructions for receiving, from the host device, a command to reset the counter based on the set of errors being recoverable, and operating, based on the set of errors being recoverable, the memory device in a second mode in which access commands are executed.

Some examples of the method 700, apparatuses, and non-transitory computer-readable medium described herein may further include operations, features, means, or instructions for disabling the memory device (e.g., by entering into a locked state) based on the set of errors being non-recoverable.

Some examples of the method 700, apparatuses, and non-transitory computer-readable medium described herein may further include operations, features, means, or instructions for determining the set of errors based on an error correcting code associated with the data retrieved from the memory device, correcting the set of errors in the data using the error correcting code, where correcting the set of errors may be based on receiving an access command or a command to refresh a portion of the memory device, and transmitting, to the host device, the data including the corrected set of errors.

Some examples of the method 700, apparatuses, and non-transitory computer-readable medium described herein may further include operations, features, means, or instructions for determining, based on an error correcting code, that a first subset of the set of errors may be correctable errors, and refraining from transmitting an indication of the first subset of correctable errors based on the determination that the first subset of the set of errors may be correctable errors.

Some examples of the method 700, apparatuses, and non-transitory computer-readable medium described herein may further include operations, features, means, or instructions for determining, based on the error correcting code, that a second subset of the set of errors may be uncorrectable errors, and transmitting, to the host device, an indication of the uncorrectable errors based on the determination that the second subset of the set of errors may be uncorrectable errors.

Some examples of the method 700, apparatuses, and non-transitory computer-readable medium described herein may further include operations, features, means, or instructions for adjusting a refresh rate of the memory device based on detecting the set of errors. Some examples of the method 700, apparatuses, and non-transitory computer-readable medium described herein may further include operations, features, means, or instructions for identifying a temperature (e.g., a junction temperature) of the memory device, and transmitting, to the host device, an indication of the temperature of the memory device based on detecting the set of errors. In some examples of the method 700, apparatuses, and non-transitory computer-readable medium described herein, the threshold of errors includes a threshold quantity of errors, or a threshold type of errors, or a threshold of errors at a location of the memory device, or a threshold frequency of errors, or a combination thereof.

Some examples of the method 700, apparatuses, and non-transitory computer-readable medium described herein may further include operations, features, means, or instructions for receiving a signal that indicates whether to perform the determination that the set of errors satisfy the threshold, or perform the transmission of the indication, or a combination thereof, where the signal may be based on the data stored at the memory device, and determining, based on the signal, whether to perform the determination that the set of errors satisfy the threshold, or perform the transmission of the indication, or a combination thereof. In some examples of the method 700, apparatuses, and non-transitory computer-readable medium described herein, the configuration of the threshold may be based on a type of the data, or a location of the data at the memory device, or a combination thereof.

Figure 8:
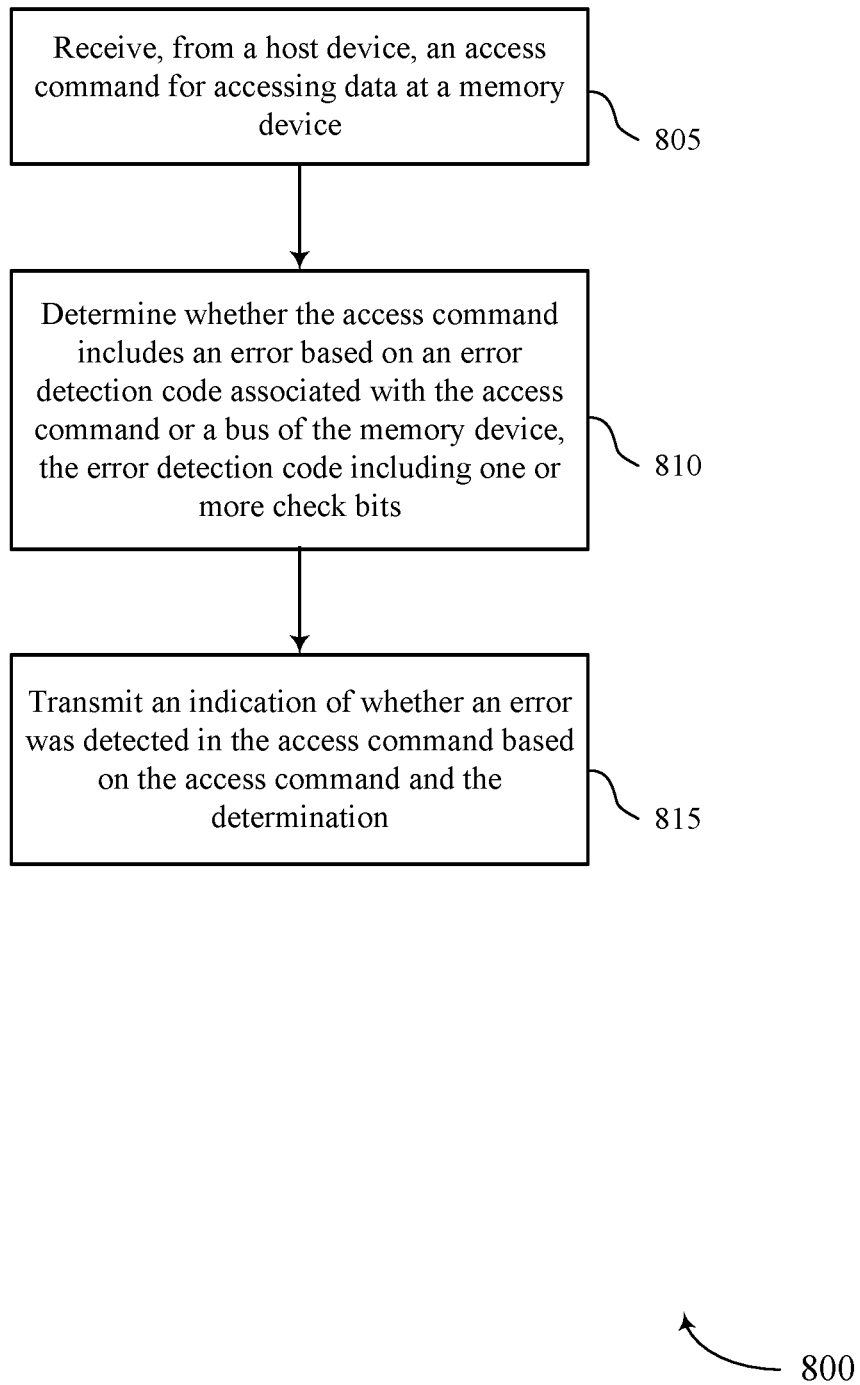

FIG. 8 shows a flowchart illustrating a method 800 that supports the dynamic control of error management and signaling in accordance with aspects disclosed herein. The operations of method 800 may be implemented by a memory device or its components as described with reference to FIGS. 1-6. For example, the operations of method 800 may be performed by a memory device 310 as described with reference to FIG. 3 or a memory device 610 as described with reference to FIG. 6. In some examples, the memory device may execute a set of instructions or codes to control the functional elements of the memory device to perform the functions described herein.

At 805, the memory device may receive, from a host device, an access command for accessing data at a memory device. The access command may include, for example, instructions to read or write data to a memory array. The operations of 805 may be performed according to the methods described with reference to FIGS. 1-6.

At 810, the memory device may determine whether the access command includes an error based on an error detection code associated with the access command or a bus of the memory device. In some examples, the error detection code includes one or more check bits. For example, the error detection code may be a parity bit appended to the access command, and the memory device may determine whether a party check passes or fails based on the included parity bit. In some cases, the error detection code may be associated with a particular bus of the memory device and may be used to determine if there are errors in an address (e.g., a row address, a column address) used in response to the received access command (where the access command may have been received error-free). That is, the propagation of the command and addresses to the memory array may have errors that may be detected through the use of the error detecting code. The operations of 810 may be performed according to the methods described with reference to FIGS. 1-6.

At 815, the memory device may transmit an indication of whether an error was detected in the access command or the bus based on the access command and the determination. In such cases, if an access command or bus includes an error that is identified based on the error detection code, the memory device may notify a host device that the command included errors. Additionally or alternatively, the indication may signal that an error was introduced to an address, which may have caused a conflict in storing or obtaining data responsive to the access command. The operations of 815 may be performed according to the methods described with reference to FIGS. 1-6.

In some examples, an apparatus as described herein may perform a method or methods, such as the method 800. The apparatus may include features, means, or instructions (e.g., a non-transitory computer-readable medium storing instructions executable by a processor) for receiving, from a host device, an access command for accessing data at a memory device, determining whether the access command includes an error based on an error detection code associated with the access command or a bus of the memory device, the error detection code including one or more check bits, and transmitting an indication of whether an error was detected in the access command based on the access command and the determination.

Some examples of the method 800, apparatuses, and non-transitory computer-readable medium described herein may further include operations, features, means, or instructions for executing the access command based on a determination that the access command does not include an error based on the error detection code. Some examples of the method 800, apparatuses, and non-transitory computer-readable medium described herein may further include operations, features, means, or instructions for transmitting, to the host device, an indication that the access command is error free based at least in part on the determination.

Some examples of the method 800, apparatuses, and non-transitory computer-readable medium described herein may further include operations, features, means, or instructions for refraining from executing the access command based on a determination that the access command includes an error based on the error detection code. Some examples of the method 800, apparatuses, and non-transitory computer-readable medium described herein may further include operations, features, means, or instructions for transmitting, to the host device, an indication that the access command includes the error based at least in part on the determination.

Some examples of the method 800, apparatuses, and non-transitory computer-readable medium described herein may further include operations, features, means, or instructions for transitioning, by the memory device, to a state that refrains from executing the access command and one or more additional commands received after the access command, receiving, from the host device, a command to exit the state based on the error being correctable, and receiving, based on the command to exit the state, a retransmission of the access command having the error corrected.

Figure 9:
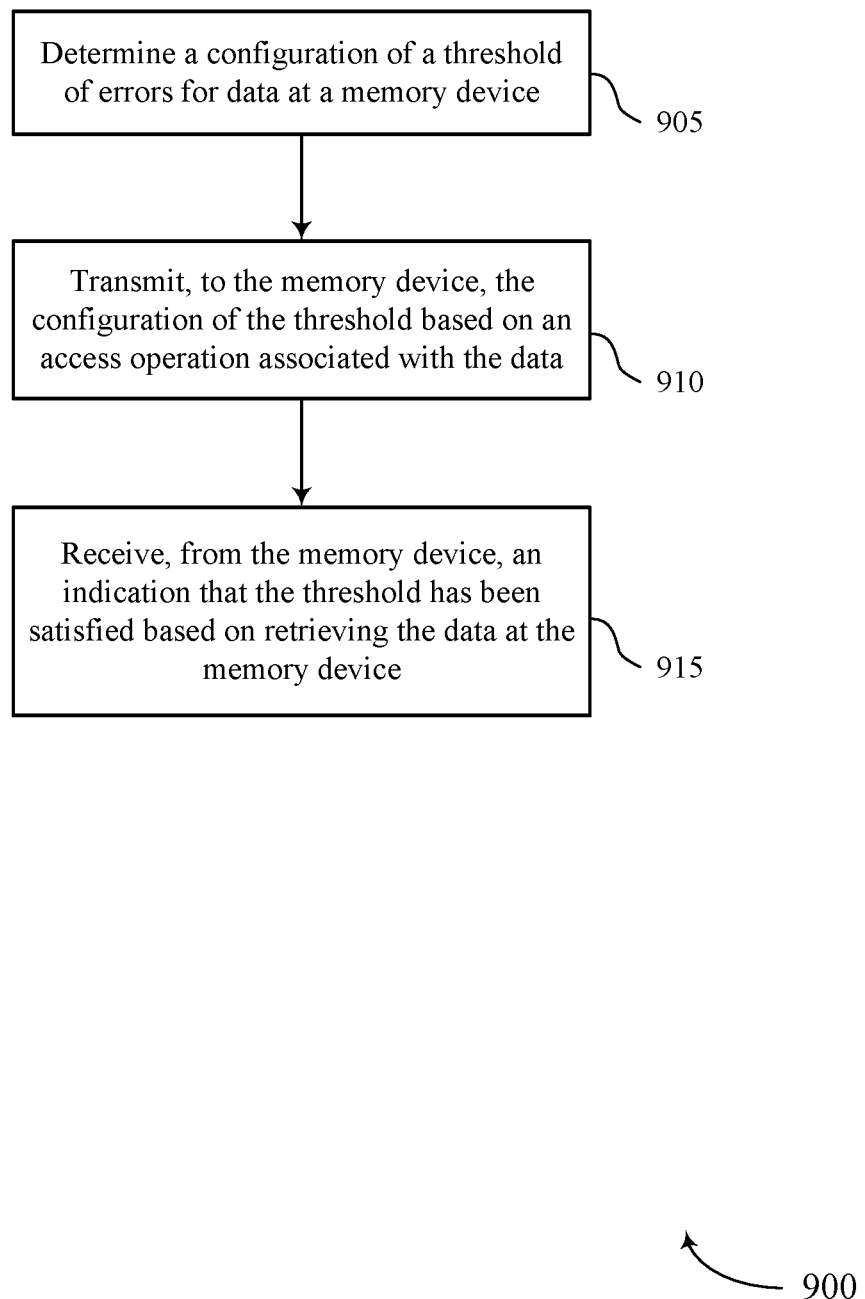

FIG. 9 shows a flowchart illustrating a method 900 that supports the dynamic control of error management and signaling in accordance with aspects disclosed herein. The operations of method 900 may be implemented by a controller or its components as described with reference to FIGS. 1-6. For example, the operations of method 900 may be performed by a controller 605 as described with reference to FIG. 6. In some examples, the controller may execute a set of codes to control the functional elements of a device (e.g., a memory device, which may comprise a memory device 110 as described with reference to FIG. 1) to perform the functions described herein.

At 905, the controller may determine a configuration of a threshold of errors for data at a memory device. In such cases, the controller may determine an application, or a type of data associated with access commands. For example, the data may be associated with mission critical operations, and the controller may configure a relatively low threshold based on the tolerances of the mission critical operation. Alternatively, the data may be associated with image rendering or video streaming, and the threshold may be relatively higher. The operations of 905 may be performed according to the methods described with reference to FIGS. 1-6.

At 910, the controller may transmit, to the memory device, the configuration of the threshold based on an access operation associated with the data. The configuration may be transmitted to the memory device over a channel coupled with the memory device. The operations of 910 may be performed according to the methods described with reference to FIGS. 1-6.

At 915, the controller may receive, from the memory device, an indication that the threshold has been satisfied based on retrieving the data at the memory device. In such cases, the memory device may determine that the threshold was satisfied when retrieving data from a memory array (or a portion of a memory array) in response to a read command. Further, based on the satisfied threshold, the memory device may enter a locked state where future commands are not executed. The controller may identify the errors, signal to the memory device to exit the locked state and re-transmit a command to obtain corrected data from the memory device. The operations of 915 may be performed according to the methods described with reference to FIGS. 1-6.

In some examples, an apparatus as described herein may perform a method or methods, such as the method 900. The apparatus may include features, means, or instructions (e.g., a non-transitory computer-readable medium storing instructions executable by a processor) for determining a configuration of a threshold of errors for data at a memory device, transmitting, to the memory device, the configuration of the threshold based on an access operation associated with the data, and receiving, from the memory device, an indication that the threshold has been satisfied based on retrieving the data at the memory device.

Some examples of the method 900, apparatuses, and non-transitory computer-readable medium described herein may further include operations, features, means, or instructions for determining the configuration of the threshold based on a type of the data, or a location of the data at the memory device, or a combination thereof.

Some examples of the method 900, apparatuses, and non-transitory computer-readable medium described herein may further include operations, features, means, or instructions for receiving, from the memory device, an indication of one or more errors associated with a first location of the memory device, and writing additional data to a second location of the memory device based on the indication of the one or more errors, the second location being different than the first location.

Some examples of the method 900, apparatuses, and non-transitory computer-readable medium described herein may further include operations, features, means, or instructions for analyzing one or more errors in the data associated with the threshold based on the received indication, and transmitting, to the memory device, a command that includes corrected data based on analyzing the one or more errors.

Figure 10:
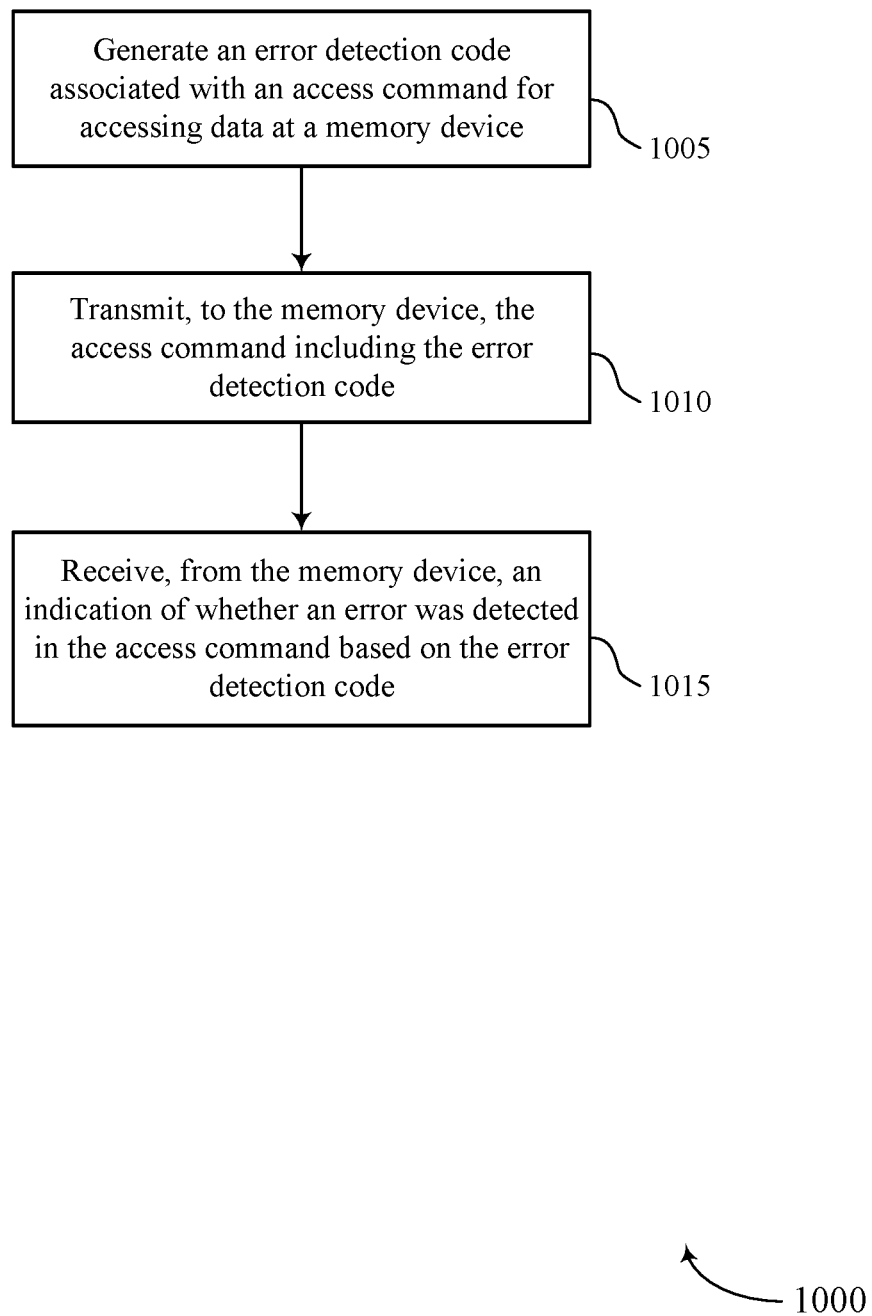

FIG. 10 shows a flowchart illustrating a method 1000 that supports the dynamic control of error management and signaling in accordance with aspects disclosed herein. The operations of method 1000 may be implemented by a controller or its components as described with reference to FIGS. 1-6. For example, the operations of method 1000 may be performed by a controller 605 as described with reference to FIG. 6. In some examples, the controller may execute a set of codes to control the functional elements of a device (e.g., a memory device, which may comprise a memory device 110 as described with reference to FIG. 1) to perform the functions described herein.

At 1005, the controller may generate an error detection code associated with an access command for accessing data at a memory device. For example, the error detection code may include one or more check bit that enable a receiving device (e.g., a memory device) to determine if the access command was affected by errors during or after transmission. The operations of 1005 may be performed according to the methods described with reference to FIGS. 1-6.

At 1010, the controller may transmit, to the memory device, the access command including the error detection code. In such cases, the controller may use one or more channel coupled with the memory device to transmit the access command. The operations of 1010 may be performed according to the methods described with reference to FIGS. 1-6.

At 1015, the controller may receive, from the memory device, an indication of whether an error was detected in the access command based on the error detection. For example, the controller may receive an indication that one or more previously transmitted commands included an error when it was received. The controller may retransmit any commands that included errors. In cases where the errors persist with repeated commands, the controller may take steps to disable a particular memory device and use another memory device for the access operation. The operations of 1015 may be performed according to the methods described with reference to FIGS. 1-6.

In some examples, an apparatus as described herein may perform a method or methods, such as the method 1000. The apparatus may include features, means, or instructions (e.g., a non-transitory computer-readable medium storing instructions executable by a processor) for generating an error detection code associated with an access command for accessing data at a memory device, transmitting, to the memory device, the access command including the error detection code, and receiving, from the memory device, an indication of whether an error was detected in the access command based on the error detection code.

Some examples of the method 1000, apparatuses, and non-transitory computer-readable medium described herein may further include operations, features, means, or instructions for receiving an indication that an error was detected in the access command based on the error detection code, identifying the error in the access command based on the indication, and retransmitting the access command with the identified error corrected.

Some examples of the method 1000, apparatuses, and non-transitory computer-readable medium described herein may further include operations, features, means, or instructions for transmitting, to the memory device, an indication to exit from a state that refrains from executing commands, where the indication to exit from the state may be based on a set of errors in the access command being correctable. In some examples of the method, apparatuses, and non-transitory computer-readable medium described herein, the error detection code includes one or more check bits associated with the access command.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

As used herein, the term "virtual ground" refers to a node of an electrical circuit that is held at a voltage of approximately zero volts (0V) but that is not directly coupled with ground. Accordingly, the voltage of a virtual ground may temporarily fluctuate and return to approximately 0V at steady state. A virtual ground may be implemented using various electronic circuit elements, such as a voltage divider consisting of operational amplifiers and resistors. Other implementations are also possible. "Virtual grounding" or "virtually grounded" means connected to approximately 0V.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some cases, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The term "layer" used herein refers to a stratum or sheet of a geometrical structure. each layer may have three dimensions (e.g., height, width, and depth) and may cover at least a portion of a surface. For example, a layer may be a three-dimensional structure where two dimensions are greater than a third, e.g., a thin-film. Layers may include different elements, components, and/or materials. In some cases, one layer may be composed of two or more sublayers. In some of the appended figures, two dimensions of a three-dimensional layer are depicted for purposes of illustration. Those skilled in the art will, however, recognize that the layers are three-dimensional in nature.

As used herein, the term "electrode" may refer to an electrical conductor, and in some cases, may be employed as an electrical contact to a memory cell or other component of a memory array. An electrode may include a trace, wire, conductive line, conductive layer, or the like that provides a conductive path between elements or components of memory array.

The term "photolithography," as used herein, may refer to the process of patterning using photoresist materials and exposing such materials using electromagnetic radiation. For example, a photoresist material may be formed on a base material by, for example, spin-coating the photoresist on the base material. A pattern may be created in the photoresist by exposing the photoresist to radiation. The pattern may be defined by, for example, a photo mask that spatially delineates where the radiation exposes the photoresist. Exposed photoresist areas may then be removed, for example, by chemical treatment, leaving behind the desired pattern. In some cases, the exposed regions may remain and the unexposed regions may be removed.

As used herein, the term "shorting" refers to a relationship between components in which a conductive path is established between the components via the activation of a single intermediary component between the two components in question. For example, a first component shorted to a second component may exchange signals with the second component when a switch between the two components is closed. Thus, shorting may be a dynamic operation that enables the flow of charge between components (or lines) that are in electronic communication.

The devices discussed herein, including a memory array, may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are signals), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus comprising:
a memory array;
first logic coupled with the memory array, wherein the first logic is configured to generate a first error correction code for data associated with a first command received from a host device and subsequently detect one or more errors in the data based at least in part on a second command being received from the host device;
second logic coupled with the memory array and the first logic, wherein the second logic is configured to correct the one or more errors in the data determined by the first logic; and
third logic coupled with the first logic and the second logic, wherein the third logic comprises a counter that is configured to be incremented based at least in part on the first logic detecting the one or more errors in the data, the second logic correcting the one or more errors in the data, or both.

2. The apparatus of claim 1, wherein:
a first portion of the memory array is configured to store the data; and
the first logic is configured to store the first error correction code to a second portion of the memory array and determine the one or more errors in the data using the first error correction code.

3. The apparatus of claim 1, wherein the third logic is configured to output an indication associated with a value of the counter to the host device based at least in part on the value satisfying a threshold value or in response to receiving a request from the host device.

4. The apparatus of claim 3, wherein the threshold value is based at least in part on an application associated with the data, or a storage location for the data within the memory array, or any combination thereof.

5. The apparatus of claim 3, wherein the third logic is configured to store the threshold value based at least in part on an indication of the threshold value received from the host device.

6. The apparatus of claim 5, wherein the third logic is configured to store multiple threshold values, each of the multiple threshold values corresponding to a respective application associated with a respective set of data at the memory array; or corresponding to a respective portion of the memory array, or any combination thereof.

7. An apparatus comprising:
an array of memory cells; and
a controller configured to cause the apparatus to:
receive, from a host device, an indication of a first threshold quantity of errors for first data at the array of memory cells, wherein the first threshold quantity of errors is based at least in part on a first application associated with the first data;
determine a set of errors in the first data as retrieved from the array of memory cells;
determine that the set of errors satisfies the first threshold quantity of errors; and
transmit, to the host device, an indication that the first threshold quantity of errors has been satisfied.

8. The apparatus of claim 7, wherein the controller is further configured to cause the apparatus to:
retrieve the first data from a bank of the array of memory cells, wherein determining that the set of errors satisfies the first threshold quantity of errors is based at least in part on the set of errors being associated with the bank.

9. The apparatus of claim 7, wherein the controller is further configured to cause the apparatus to:
increment a counter for each error of the set of errors in the first data based at least in part on determining the set of errors; and
operate, based at least in part on incrementing the counter for each error of the set of errors, the apparatus in a first mode in which the apparatus refrains from executing access commands for the array of memory cells.

10. The apparatus of claim 7, wherein the controller is further configured to cause the apparatus to:
adjust a refresh rate for the array of memory cells based at least in part on detecting the set of errors.

11. The apparatus of claim 7, wherein the controller is further configured to cause the apparatus to:
identify a temperature of the array of memory cells; and
transmit, to the host device, an indication of the temperature of the array of memory cells based at least in part on detecting the set of errors.

12. The apparatus of claim 7, wherein the controller is further configured to cause the apparatus to:
receive, from the host device, an indication of a second threshold quantity of errors for second data, wherein the second threshold quantity of errors is based at least in part on a second application associated with the second data, and wherein the second threshold quantity of errors is different than the first threshold quantity of errors.

13. The apparatus of claim 7, wherein the controller is configured to cause the apparatus to:
receive a signal that indicates to perform the determination that the set of errors satisfies the first threshold quantity of errors, or to transmit the indication that the first threshold quantity of errors has been satisfied, or any combination thereof.

14. The apparatus of claim 7, wherein the first threshold quantity of errors comprises a threshold type of errors, or a threshold of errors at a location of the array of memory cells, or a threshold frequency of errors, or any combination thereof.

15. The apparatus of claim 7, wherein the first threshold quantity of errors is based at least in part on a type of the first data, or a location of the first data within the array of memory cells, or any combination thereof.

16. An apparatus comprising:
an array of memory cells;
error correction code logic; and a controller configured to cause the apparatus to:
receive, from a host device, an access command for accessing data at the array of memory cells;
determine that the access command includes an error using the error correction code logic and based at least in part on an error detection code associated with the access command; and
perform one or more self-refresh operations based at least in part on determining that the access command includes the error.

17. The apparatus of claim 16, wherein the controller is configured to cause the apparatus to:
receive, from the host device, a second access command for accessing second data at the array of memory cells;
determine that the second access command does not include an error using the error correction code logic and based at least in part on a second error detection code associated with the second access command; and
execute the second access command based at least in part on determining that the second access command does not include an error.

18. The apparatus of claim 17, wherein the controller is further configured to cause the apparatus to:
transmit, to the host device, an indication that the second access command is error-free based at least in part on determining that the second access command does not include an error.

19. The apparatus of claim 16, wherein the controller is further configured to cause the apparatus to:
refrain from executing the access command based at least in part on determining that the access command includes the error; or
transmit, to the host device, an indication that the error was detected in the access command based at least in part on determining that the access command includes the error.

20. The apparatus of claim 16, wherein the controller is further configured to cause the apparatus to:
receive, from the host device, an indication to exit from a state in which the apparatus refrains from executing commands from the host device, wherein the indication to exit from the state is based at least in part on the error being correctable.

* * * * *